US008076076B2

(12) United States Patent
Osborn et al.

(10) Patent No.: US 8,076,076 B2
(45) Date of Patent: Dec. 13, 2011

(54) SYSTEMS AND METHODS FOR PROCESSING HYBRID SEED

(75) Inventors: Thomas C. Osborn, Sacramento, CA (US); Paul Chung, Woodland, CA (US); Joseph J. King, Davis, CA (US); Kevin Deppermann, St. Charles, MO (US); Jamaine R. Hubbard, St. Louis, MO (US)

(73) Assignee: Monsanto Technology LLC, St. Louis, MO (US)

( * ) Notice: Subject to any disclaimer, the term of this patent is extended or adjusted under 35 U.S.C. 154(b) by 511 days.

(21) Appl. No.: 12/200,291

(22) Filed: Aug. 28, 2008

(65) Prior Publication Data

US 2009/0061449 A1    Mar. 5, 2009

Related U.S. Application Data

(60) Provisional application No. 60/968,800, filed on Aug. 29, 2007.

(51) Int. Cl.
C12Q 1/68 (2006.01)
G01N 1/00 (2006.01)
A01H 5/00 (2006.01)

(52) U.S. Cl. ............. 435/6.1; 435/4; 435/410; 436/174; 800/303; 800/307; 800/308; 800/309; 800/310

(58) Field of Classification Search ............... 435/4, 6.1; 800/303, 307, 308, 309, 310, 320.1; 436/174
See application file for complete search history.

(56) References Cited

U.S. PATENT DOCUMENTS

| | | | |
|---|---|---|---|
| 3,852,914 A | | 12/1974 | Levengood |
| 4,696,308 A | | 9/1987 | Meller et al. |
| 4,827,776 A | | 5/1989 | Gale et al. |
| 6,018,101 A | * | 1/2000 | Zhang et al. .................. 800/274 |
| 6,537,826 B1 | * | 3/2003 | Horigane ...................... 436/176 |
| 2002/0144458 A1 | | 10/2002 | Hunter et al. |
| 2003/0148258 A1 | * | 8/2003 | Kim et al. ........................... 435/4 |
| 2004/0091888 A1 | | 5/2004 | Nishio et al. |
| 2006/0046244 A1 | | 3/2006 | Deppermann |
| 2006/0046264 A1 | | 3/2006 | Deppermann |

FOREIGN PATENT DOCUMENTS

| | | |
|---|---|---|
| DE | 100 48 643 A1 | 5/2001 |
| GB | 1151988 | 5/1969 |
| GB | 1471076 | 4/1977 |
| WO | 98/14046 A1 | 4/1998 |
| WO | 01/89288 A1 | 11/2001 |
| WO | 03/084847 A2 | 10/2003 |
| WO | 03/100381 | 12/2003 |
| WO | 2006/026466 A2 | 3/2006 |
| WO | 2006/026467 A2 | 3/2006 |
| WO | 2007/103769 | 9/2007 |

OTHER PUBLICATIONS

Park et al. Development of RAPD Markers Linked to the Male-Sterile ms-3 Gene in Melon. Acta Hort. 637, ISHS 2004, pp. 243-249.*
von Post et al. A high-throughput DNA extraction method for barley seed. Euphytica 130: 255-260, 2003.*
U.S. Appl. No. 11/680,611, filed Aug. 30, 2007, Kevin L. Deppermann et al.
U.S. Appl. No. 11/213,431, filed Mar. 2, 2006, Kevin L. Deppermann.
U.S. Appl. No. 11/213,432, filed Mar. 2, 2006, Kevin L. Deppermann.
U.S. Appl. No. 11/213,434, filed Mar. 2, 2006, Kevin L. Deppermann.
U.S. Appl. No. 11/213,435, filed Mar. 2, 2006, Kevin L. Deppermann.
Kotyk, et al., High-Throughput Determination of Oil Content in Corn Kernels Using Nuclear Magnetic Resonance Imaging, JAOCS, vol. 82, No. 12, 2005, pp. 855-862.
Krysan, Breakthrough Technologies, Ice-Cap. A High-Throughput Method for Capturing Plant Tissue Samples for Genotype Analysis, Plant Physiology, Jul. 2004 vol. 135, pp. 1162-1169.
Von Post, et al., A High-Throughput DNA Extraction Method for Barley Seed, Euphytica 130: 255-260, 2003.
Cabrera, et al., Open Storage of Soybean Seed in Mississippi, Mississippi Agricultural and Forestry Experiment Station, Sep. 2002. http://msucares.com/pubs/techbulletins/tb204.htm, 7 pp.
Serial Extraction of Endosperm Drillings (SEED)—A Method for Detecting Transgenes and Proteins in Single Viable Maize Kernels, Varaporn Sangton, et al., Planet Molecular Biology Reporter 19: 151-158, Jun. 2001, International Society for Planet Molecular Biology.
Kramer, et al., Transgenic Avidin Maize is Resistant to Storage Insect Pests, Nature Biotechnology, vol. 18, Jun. 2000, pp. 670-674.
Gillaspie, Jr., et al., Sensitive Method for Testing Peanut Seed Lots for Peanut Stripe and Peanut Mottle Viruses by Immunocapture-Reverse Transcription-Polymerase Chain Reaction, Plant Disease, May 2000, pp. 559-561.
Morrison, Sampling in Seed Health Testing, The American Phytopathology Society, 1999, 89: 1084-1087.
Smith, et al., Genetic Purity and Testing Technologies for Seed Quality: A Company Perspective, Seed Science Research, 1998, vol. 8, pp. 285-293.

* cited by examiner

Primary Examiner — June Hwu
(74) Attorney, Agent, or Firm — Polster, Lieder, Woodruff & Lucchesi, L.C.

(57) ABSTRACT

The present disclosure provides for systems and method for producing hybrid seed. In various embodiments, the disclosure provides a system for the high-throughput, nondestructive sampling of seeds. In another embodiment, a high-throughput, nondestructive method for producing hybrid seeds comprises removing a sample from a plurality of seeds in the population while preserving the germination viability of the seed and analyzing the sample for the presence or absence of one or more genetic markers indicative of a male-sterile gene.

11 Claims, 12 Drawing Sheets

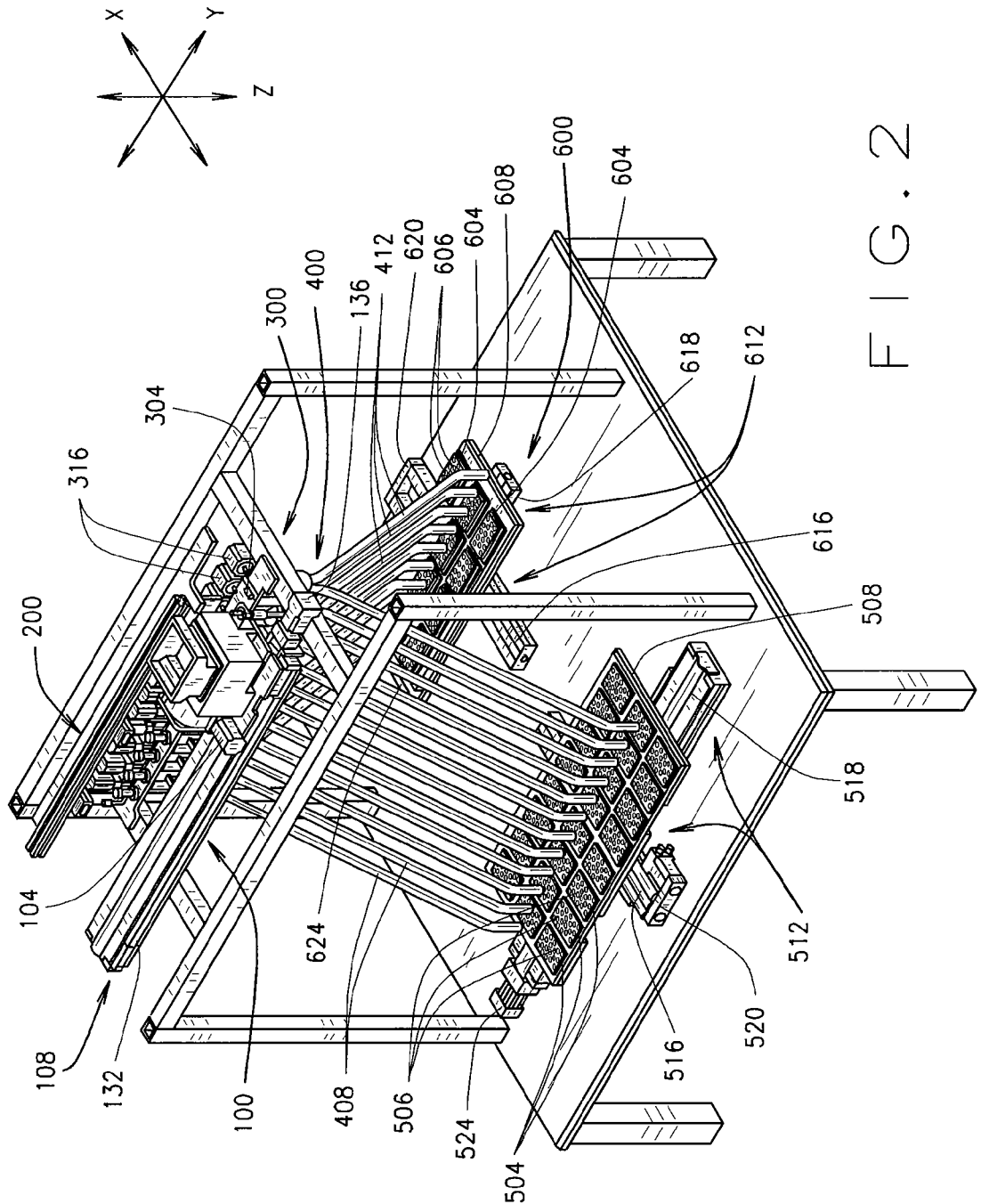

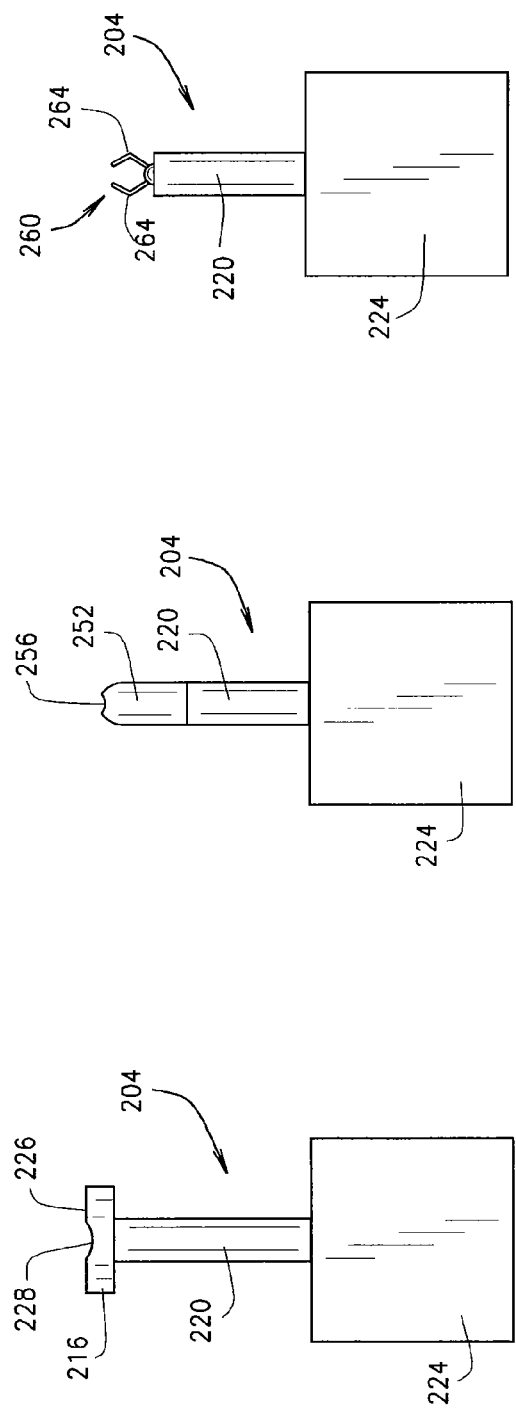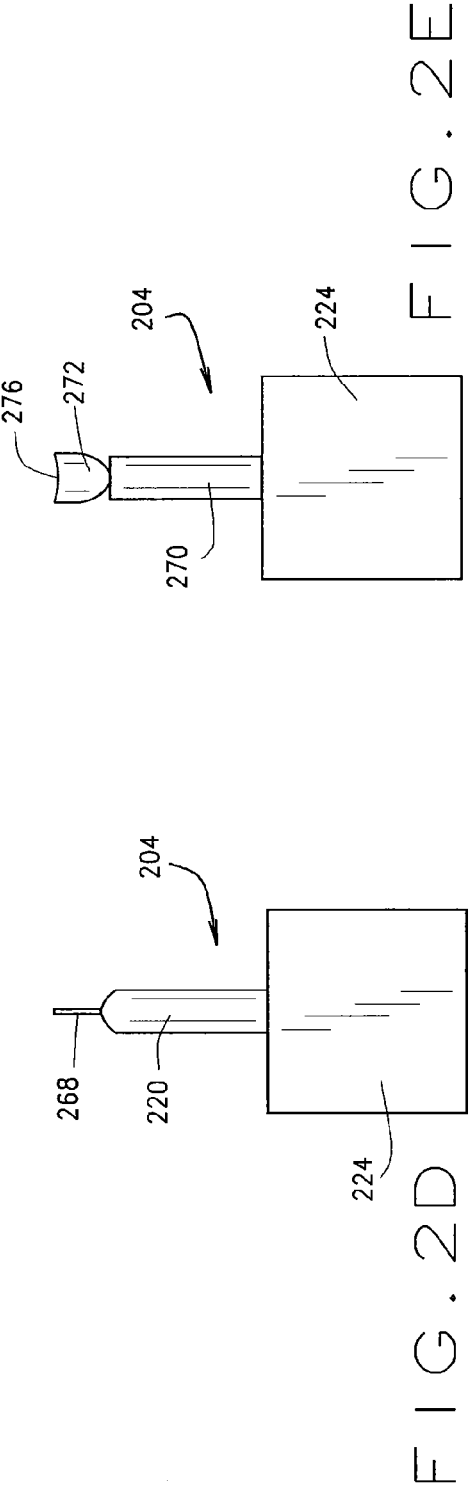

SYSTEMS AND METHODS FOR PROCESSING HYBRID SEED

CROSS-REFERENCE TO RELATED APPLICATIONS

This application claims the benefit of U.S. Provisional Application No. 60/968,800, filed on Aug. 29, 2007. The disclosure of the above application is incorporated herein in its entirety.

FIELD

The present disclosure relates to the field of plant breeding. More specifically, this disclosure provides systems and methods for producing various hybrid seed.

BACKGROUND

The statements in this section merely provide background information related to the present disclosure and may not constitute prior art.

Various hybrid seed is currently produced by removing male flower parts of the female parent by hand-emasculation and then hand-pollinating the female flowers with pollen from a male parent. This method is labor intensive and expensive, and limits seed production to areas where the use of hand labor is available and cost-effective. For example, gynecious plant types have been developed for use as female parents in some types of melons, and if strongly expressed, these types do not require hand manipulations. However, the gynecious trait is complexly inherited and incompletely penetrant, making it difficult to breed and use.

Genetic male-sterility controlled by single recessive nuclear genes has been identified in cucurbits and other fruit and vegetable bearing plants. This trait could be used to develop male-sterile female parents that would not require flower removal or hand emasculation, and it would allow the use of bees for pollination. However, male-sterile lines always segregate for sterile and fertile plants because they must be maintained by pollinating male-sterile plants (ms/ms) with heterozygous, isogenic male-fertile plants (Ms/ms). Thus, the use of nuclear genic male-sterility requires that the male-fertile segregants be removed from the female parent rows in hybrid seed production fields. This process is labor intensive and often ineffective because the male-fertile plants are difficult to identify in the field. For this reason, previous efforts by seed companies to develop this trait were abandoned.

The present disclosure addresses needs in the art for improved methods of producing hybrid seeds using high-throughput, nondestructive seed sampling systems.

SUMMARY

The present disclosure relates to systems and methods for facilitating germplasm improvement activities in seeds through the use of high-throughput, nondestructive seed sampling. With automated, nondestructive sampling, it is possible to test individual seeds in a population, and select only the seeds that possess one or more desired characteristics. This allows for new and more efficient methods for germplasm improvement and management, which lead to improved breeding populations.

In various embodiments, the present disclosure provides for an automated system for the high-throughput sampling of seeds. The system comprises a seed loading station for separating individual seeds from a plurality of like seeds in a bulk seed bin; an orientation subsystem for receiving the individual seeds from the seed loading station and orienting the individual seeds; a sampling subsystem for removing a tissue sample from the individual seeds; a seed and sample transport subsystem for conveying the seed between the sampling subsystem and a selected well in a seed collection tray after the seed has had a tissue sample removed, and for conveying the tissue sample from the sampling subsystem to a selected well in a sample collection tray.

In other embodiments, the present disclosure provides for an automated, high-throughput method for extracting sample material for testing from a population of seeds. The method comprises separating Individual seeds from the population of seeds and orienting the separated seeds in a desired orientation such that a 'Tip' of each seed, containing the embryo of each respective seed, is placed in a particular orientation while preserving the germination viability of the seed. The oriented seeds are then conveyed to a sampling retention fixture and a sample of seed tissue is removed from each seed, while preserving the germination viability of each seed. Each seed is then conveyed to a selected well in a seed collection tray after the seed has been sampled and the seed tissue sample is conveyed to a selected well in a sample collection tray.

In still other embodiments, the present disclosure provides for an automated method for the high-throughput sampling of seeds. The method includes separating individual seeds from a plurality of like seeds at a seed loading station of an automated seed processing system. The method additionally includes receiving and orienting the individual seeds, while preserving the germination viability of each seed, at an orientation subsystem of the automated seed processing system. The method further includes removing a tissue sample from the individual seeds, while preserving the germination viability of each seed, at a sampling subsystem of the automated seed processing system. Still further, the method includes depositing each seed into a selected well in a selected one of a plurality of seed collection trays after the seed has had a tissue sample removed and depositing each tissue sample into a selected well in a selected one of a plurality of sample collection trays, utilizing a seed and sample transport subsystem of the automated seed processing system. The method further yet includes storing in a database the selected well in the selected sample collection tray into which each sample was deposited and the selected well in the selected seed collection tray into which each corresponding sampled seed was deposited, such that each sample and corresponding seed from which the sample was removed can be tracked to pre-select seeds of interest.

In yet other embodiments, the present disclosure provides for a method for introgressing male sterility into a seed. The method comprises providing a population of seeds, removing a tissue sample comprising cells with nucleic acids from each seed in the population, analyzing the nucleic acids extracted from each seed for the presence of at least one genetic marker indicating the presence of a male-sterile gene, selecting seeds from the population based upon the presence of the male-sterile marker, and cultivating a fertile plant from the seed.

In still yet other embodiments, the disclosure provides for a female parent of a fruit or vegetable hybrid wherein the female parent contains at least one nuclear male sterile gene.

In the various embodiments of the present disclosure, the samples may be analyzed for one or more characteristics indicative of at least one genetic trait. Examples of such characteristics may include a genetic marker, a single nucleotide polymorphism, a simple sequence repeat, a restriction fragment length polymorphism, a haplotype, a tag SNP, an alleles of a genetic marker, a gene, a DNA-derived sequence, an RNA-derived sequence, a promoter, a 5' untranslated region of a gene, a 3' untranslated region of a gene, microRNA, siRNA, a QTL, a satellite marker, a transgene, mRNA, ds mRNA, a transcriptional profile, and a methylation pattern.

Further areas of applicability of the present teachings will become apparent from the description provided herein. It should be understood that the description and specific examples are intended for purposes of illustration only and are not intended to limit the scope of the present teachings.

BRIEF DESCRIPTION OF THE DRAWINGS

The drawings described herein are for illustration purposes only and are not intended to limit the scope of the present disclosure in any way.

FIG. 2 is an isometric view of the seed processing system shown in FIG. 1, in accordance with various embodiments of the present disclosure.

FIG. 2A is front view of an orientation pedestal of the seed processing system shown in FIG. 1, in accordance with various embodiments of the present disclosure.

FIG. 2B is front view of an orientation pedestal of the seed processing system shown in FIG. 1, in accordance with various other embodiments of the present disclosure.

FIG. 2C is front view of an orientation pedestal of the seed processing system shown in FIG. 1, in accordance with still other various embodiments of the present disclosure.

FIG. 2D is front view of an orientation pedestal of the seed processing system shown in FIG. 1, in accordance with yet other various embodiments of the present disclosure.

FIG. 2E is front view of an orientation pedestal of the seed processing system shown in FIG. 1, in accordance with various still yet other embodiments of the present disclosure.

DETAILED DESCRIPTION

The following description is merely exemplary in nature and is not intended to limit the present disclosure, application, or uses.

The present disclosure provides for novel methods to facilitate germplasm improvement activities in seeds, such as broccoli, cabbage, carrot, cauliflower, chinese cabbage, cucumber, dry bean, eggplant, fennel, garden beans, gourd, jeek, lettuce, melon, okra, onion, pea, pepper, pumpkin, radish, spinach, squash, sweet corn, tomato and watermelon, using high-throughput, nondestructive sampling of seeds. The methods are useful in analyzing seeds in order to identify and select seeds comprising one or more desired traits, markers, and genotypes. In one aspect of the disclosure, the analytical methods allow individual seeds that are present in a batch or a bulk population of seeds to be analyzed such that the chemical and/or genetic characteristics of the individual seeds can be determined.

Apparatus, systems and methods for the high-throughput, nondestructive sampling of seeds have been described. For example, commonly owned U.S. patent application Ser. No. 11/213,430 (filed Aug. 26, 2005); U.S. patent application Ser. No. 11/213,431 (filed Aug. 26, 2005); U.S. patent application Ser. No. 11/213,432 (filed Aug. 26, 2005); U.S. patent application Ser. No. 11/213,434 (filed Aug. 26, 2005); U.S. patent application Ser. No. 11/213,435 (filed Aug. 26, 2005); U.S. patent application Ser. No. 11/680,180 (filed Feb. 27, 2007); and U.S. patent application Ser. No. 11/680,611 (filed Feb. 27, 2007), which are incorporated herein by reference in their entirety, disclose apparatus and systems for the automated sampling of seeds as well as methods of sampling, testing and bulking seeds.

Figure 1:
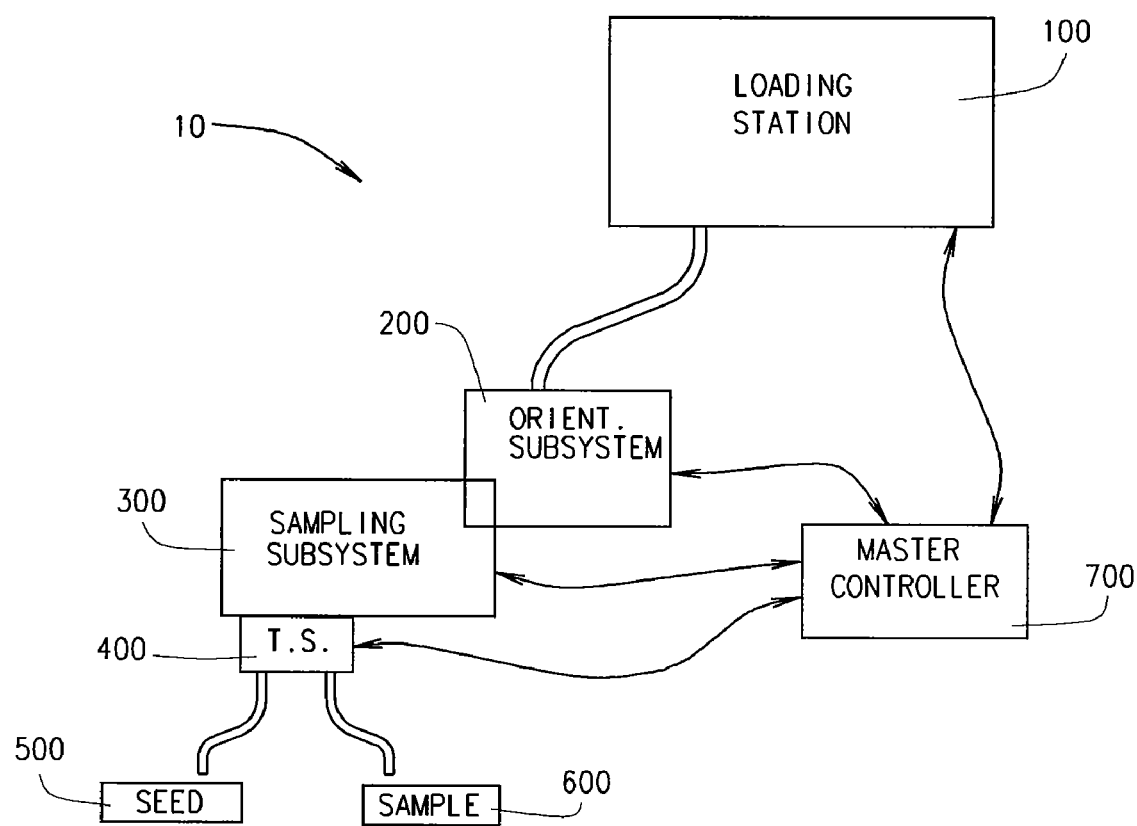
FIG. 1 is a block diagram of an automated seed processing system for nondestructively sampling seeds, in accordance with various embodiments of the present disclosure.

Referring to FIG. 1, the present disclosure provides an automated seed processing system 10 structured and operable to facilitate germplasm improvement activities in selected seeds through the use of high-throughput, nondestructive seed sampling. More particularly, as described below, the seed processing system 10 is structured and operable to test individual seeds in a population, and select only the seeds that possess one or more desired characteristics, thereby providing efficient methods for germplasm improvement and management leading to improved breeding populations.

In various embodiments, the seed processing system 10 generally includes a seed loading station 100 that is structured and operable to separate individual seeds from a plurality of like seeds, and an orientation subsystem 200 that receives the individual seeds from the seed loading station 100 and orients each seed in a desired orientation for sampling, as described below. Additionally, the seed processing system 10 generally includes a sampling subsystem 300 that is structured and operable to remove a sample, e.g., a tissue sample, from each seed, and a seed and sample transport subsystem 400 that is structured and operable for conveying each seed and the respective sample from the sampling station 300 to a seed collection assembly 500 and a sample collection assembly 600, respectively. More particularly, the seed and sample transport subsystem 400 is structured and operable to convey each sampled seed to one of a plurality of seed collection trays 504 (exemplarily shown in FIG. 2), and convey each respective sample to one of a plurality of sample collection trays 604, e.g., microplates (exemplarily shown in FIG. 2).

The seed processing system 10 additionally includes a master control system 700 that is structured and operable to control all the operations of the seed processing system 10. That is, the master control system 700 simultaneously controls and coordinates the operations of the seed loading station 100, the orientation subsystem 200, the sampling subsystem 300, the seed and sample transport subsystem 400, and the seed and sample collection assemblies 500 and 600 to carry out the separating of the seeds from the plurality of seeds, the orienting of each seed in a desired orientation, the removing of a sample from each seed, and the conveying each seed and respective sample of the corresponding seed and sample trays 504 and 604, as described below.

It should be understood that the various embodiments of the seed processing system 10, exemplarily illustrated and described herein, include various braces, beams, platforms, pedestals, stands, etc., to which various components, devices, mechanisms, systems, subsystems, assemblies and sub-assemblies described herein are coupled, connected and/or mounted. Although such braces, beams, platforms, pedestals, stands, etc., are necessary to the construction of various embodiments of the seed processing system 10, description of their placement, orientation and interconnections are not necessary for one skilled in the art to easily and fully comprehend the structure, function and operation of the various embodiments of the seed processing system 10. Moreover, such braces, beams, platforms, pedestals, stands, etc., are clearly illustrated in various figures and, as such, their placement, orientation and interconnections are easily understood by one skilled in the art. Therefore, for simplicity, such braces, beams, platforms, pedestals, stands, etc., will be referred to herein merely as system support structures, absent further description of their placement, orientation and interconnections. Additionally, certain figures described and illustrated herein may have portions of the system support structures removed, i.e., not shown, in order to more clearly illustrate the various embodiments of the seed processing system 10.

Figure 3:
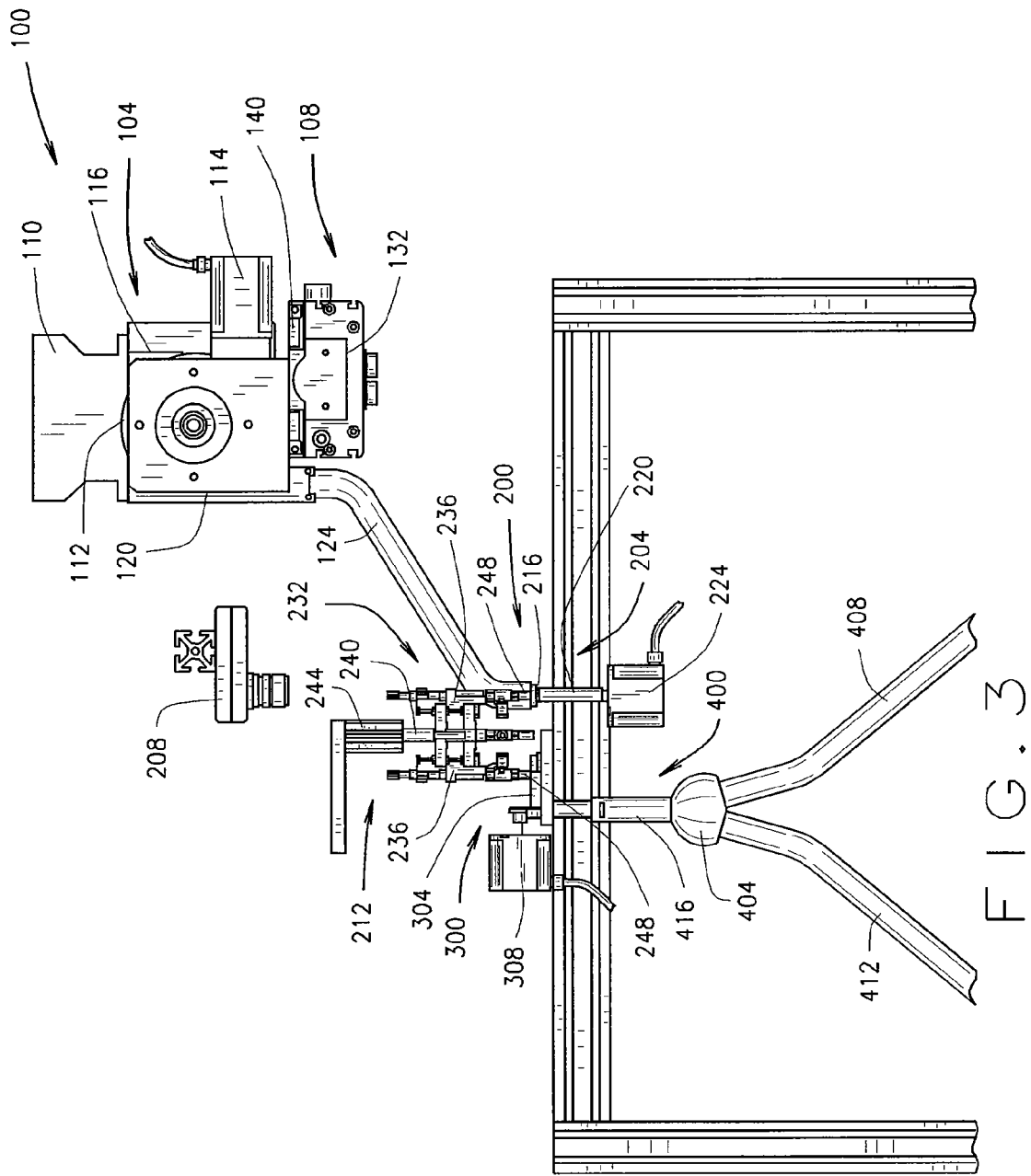
FIG. 3 is a side view of the seed processing system shown in FIGS. 1 and 2, in accordance with various embodiments of the present invention.

Referring now to FIGS. 2 and 3, in various embodiments, the loading station 100 can comprise a seed singulator 104, and the orientation subsystem 200 can comprise at plurality of rotatable orientation pedestals 204 and one or more imaging devices 208 mounted to system support structure above the orientation pedestals 204. Additionally, the sampling subsystem 300 can comprise a plurality of corresponding sampling retention fixtures 304, and the seed and sample transport subsystem 400 can comprise a plurality of diverter assemblies 404 mounted beneath the sampling retention fixtures 304.

Figure 4:
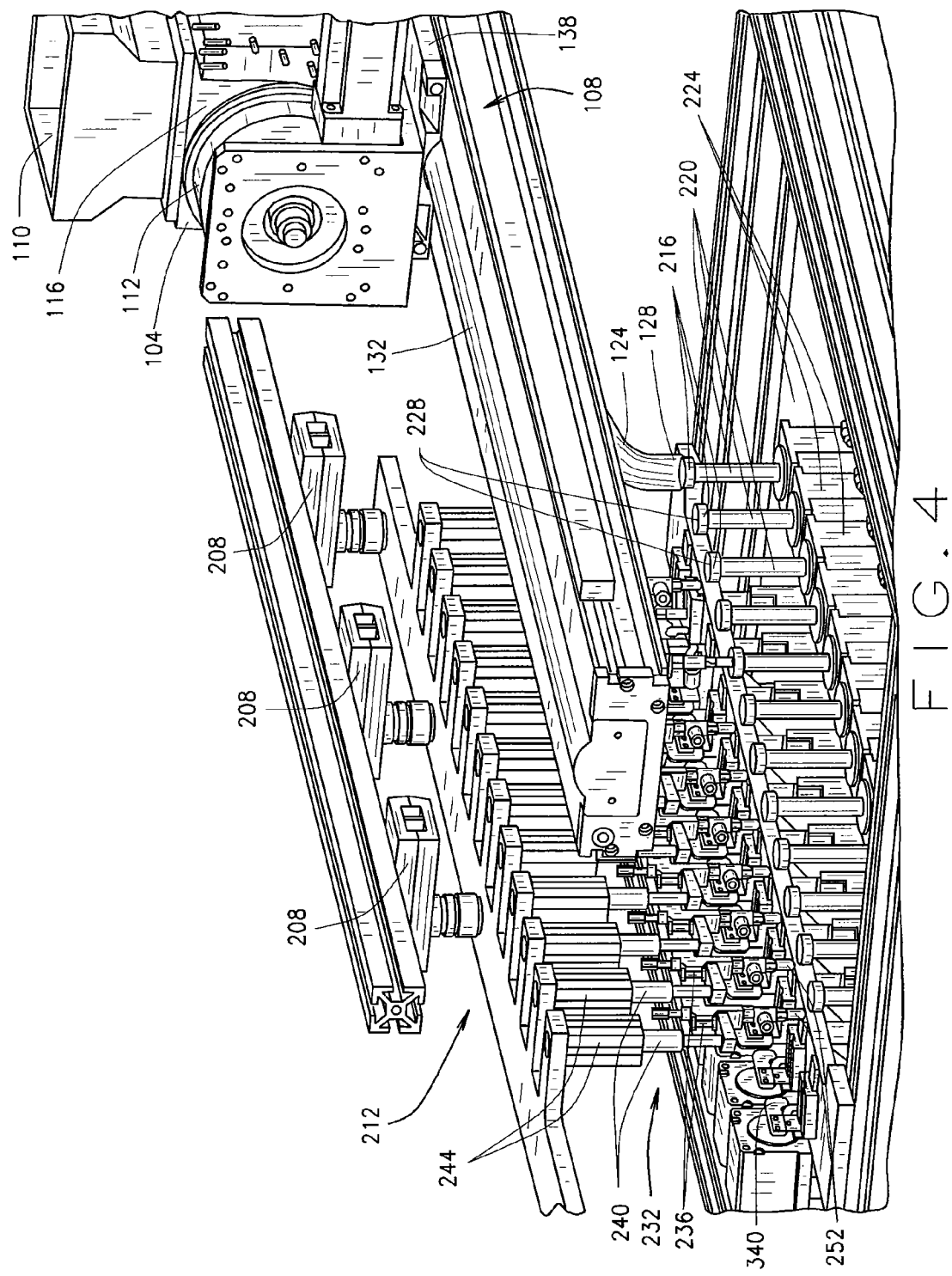
FIG. 4 is an isometric view of a seed loading station, a seed orientation subsystem and a seed sampling subsystem of the seed processing system shown in FIGS. 1, 2 and 3, in accordance with various embodiments of the present disclosure.

Referring now to FIGS. 2, 3 and 4, in various embodiments, the seed singulator 104 comprises a seed bin 110, a separating wheel 112 and a seed singulation chamber 116 located between a bottom (not shown) of the seed bin 110 and the separating wheel 112. The seed singulator 104 additionally includes a motor 114, e.g., and indexing motor, coupled to the separation wheel 112 to controllably rotate the separating wheel 112, as controlled by the master control system 700. Moreover, the separating wheel 112 is mounted for rotation in a vertical plane such that, during operation, a face (not shown) of the separating wheel 112 rotates adjacent an open side of the seed singulation chamber 116 and also adjacent a seed collector 120 located between the seed bin 110 and the separating wheel 112. The face of the seed separating wheel 112 includes a plurality of recessed ports (not shown) that are circumferentially spaced apart around a perimeter portion of the separating wheel 112. Each recessed port extends through the face of the separating wheel 112 and is communicatively coupled to a vacuum system (not shown) such that a vacuum can be provided at each of the recessed ports.

In various embodiments, to initiate operation of the seed processing system 10, a plurality of seeds to be sampled and tested are placed in an interior reservoir of the seed bin 110. Via gravity, forced air and/or a vacuum, the seeds deposited into the seed bin interior chamber are controllably funneled into the singulation chamber 116 and contact the face of the separating wheel 112. Additionally, a vacuum is provided to at least some of the recessed ports, e.g., a vacuum is provided to at least the recessed ports traveling adjacent the open side of the seed singulation chamber 116 as the separating wheel 112 rotates.

To separate seeds, substantially one-at-a-time, from the plurality of seeds deposited into the seed bin 110, i.e., singulate the seeds, the separating wheel 112 is incrementally rotated, via the motor 114. As the separating wheel 112 is rotated each recessed port sequentially travels past the open side of the seed singulation chamber 116, extracts at least one seed, and deposits each seed into the seed collector 120. That is, as the separating wheel 112 incrementally rotates and the recessed ports incrementally pass adjacent the singulation chamber 116, individual ones of the seeds in contact with the separating wheel face are picked up and held at each recessed port by the vacuum provided at the respective recessed ports. As the separating wheel 112 continues to incrementally rotate, the seeds are carried out of the singulation chamber 116 to the seed collector 120 where each seed is removed from the face of the separating wheel 112. After each seed is removed from the separating wheel 112, each seed is funneled, via the seed collector 120, to a seed transfer tube 124. Each seed is then passed through the seed transfer tube 124, via gravity, vacuum or forced air, and transferred to a respective one of orientation pedestals 204 of the seed orientation subsystem 200.

In various embodiments, the seed collector 120 includes a stripping plate (not shown) that is located in substantially flush with the face of the separating wheel 112 and is structured to contact and physically dislodge each seed from the respective recessed port as the separating wheel 112 incrementally rotates past the seed collector 120. Thereafter, each dislodged seed is funneled through the seed transfer tube 124 to the respective one of orientation pedestals 204. Alternatively, in various other embodiments, each seed can be released from its respective recessed port by temporarily terminating the vacuum at each individual recessed port as the individual recessed port is positioned adjacent the seed collector 120. Thereafter, the dislodged seed is transferred to the respective one of orientation pedestals 204, via the transfer tube 124. In still other embodiments, each seed can be blown from the respective recessed port by temporarily providing forced air at each individual recessed port as the individual recessed port is positioned adjacent the seed collector 120. Thereafter, the dislodged seed is transferred to the respective one of orientation pedestals 204, via the transfer tube 124.

Additionally, in various embodiments the seed loading station 100 can include a bulk seed hopper (not shown) having a shaped surface and a vibrating feeder mechanism (not shown) mounted to system support structure above the seed bin 110. Large amounts of seed can be placed in the bulk seed hopper where the seed is funneled onto the vibrating feed mechanism. The vibrating feeder mechanism can be controlled, via the master control system 700, to meter seeds into the seed bin 110 where the seeds are singulated and transferred to the seed orientation subsystem 200, as described above.

As described above, in various embodiments, the seed orientation subsystem 200 includes the plurality of the orientation pedestals 204 and the one or more imaging devices 208. Additionally, the seed orientation subsystem 200 can include a seed pick and place device bank 212 movably mounted to stationary system support structure of the seed sampler system 10.

Referring now to FIGS. 2A, 3 and 4, in various embodiments, each orientation pedestal 204 can include a seed seat 216 coupled to a distal end of a shaft 220 that is rotatable by motor 224, as controlled by the master control system 700. The seed seats 216 are structured to receive seeds from the seed transfer tube 124 and retain the seeds for imaging by the imaging device(s) 208, as described below. For example, in various embodiments, a face 226, i.e., a top surface, of each seed seat 216 can include a recessed seed reservoir 228, e.g., a groove, channel or concavity, structured to receive seeds from the seed transfer tube 124 and retain the seeds for imaging by the imaging device(s) 208, as described below. Moreover, the seed reservoirs 228 can be formed to have a shape that will cause each seed to lie 'flat' within the respective seed reservoir 228. That is, each seed reservoir 228 can be contoured to cause each respective seed to lie within the reservoir 228 on one of the opposing broad sides of the respective seed. Therefore, each seed lies on one of the respective opposing broad sides such that the germ of the seed is viewable by the imaging device(s) 208 and the 'tip' of each seed is pointing anywhere within a 360° plane that is substantially orthogonal to the respective orientation pedestal shaft 220.

Additionally, in various embodiments, each orientation pedestal 204 can be communicatively connected to a vacuum source (not shown) that is controlled by the master control system 700 to selectively provide a vacuum at the face 226 and/or seed reservoir 228 of each seed seat 216. Therefore, in such embodiments, when a seed is deposited onto an orientation pedestal 204, as described below, the seed is placed on the seed seat 216 of the respective orientation pedestals 204, and a vacuum can be provided at the face 226 and/or seed reservoir 228 of the respective seed seat 216 to firmly and steadily retain the seed thereon. Additionally, in various implementations, each seed seat 216 and/or seed reservoir 228 can be sized, and fabricated from a suitable pliable material, such that when the vacuum is provided, each seed is firmly retained on the respective orientation pedestal 204 without damaging the seeds or compromising the integrity and germination viability of the seeds, e.g., without damaging the seed embryos.

Referring now to FIG. 2B, in various embodiments, each orientation pedestal 204 can include a vacuum nozzle 252 connected to the distal end of the shaft 220 that is rotatable by the motor 224. Each vacuum nozzle 252 is communicatively connected to a vacuum source (not shown) that is controlled by the master control system 700 to selectively provide a vacuum at a tip 256 of each vacuum nozzle 252. Therefore, in such embodiments, when a seed is deposited onto an orientation pedestal 204, as described below, the seed is placed on the tip 256 of the respective orientation pedestals 204, and a vacuum is provided at the tip 256 to firmly and steadily retain the seed thereon. Moreover, the tip 256 of each vacuum nozzle 252 is structured such that each seed is securely retained on the tip 256 of a respective vacuum nozzle 252 having the 'tip' of each seed pointing anywhere within a 360° plane that is substantially orthogonal to the respective orientation pedestal shaft 220. Additionally, in various implementations, each vacuum nozzle 252 and tip 256 can be sized, and fabricated from a suitable pliable material, such that when the vacuum is provided, each seed is firmly retained on the respective orientation pedestal 204 without damaging the seeds or compromising the integrity and germination viability of the seeds, e.g., without damaging the seed embryos.

Referring now to FIG. 2C, in various embodiments, each orientation pedestal 204 can include a seed retention claw 260 connected to the distal end of the shaft 220 that is rotatable by the motor 224. Each seed retention claw 260 includes a plurality of gripping fingers 264 that are controllable by the master control system 700 to grasp and retain seeds delivered to the respective orientation pedestal 204 by the seed loading station 100. Therefore, in such embodiments, when a seed is transferred to an orientation pedestal 204, as described below, the seed is grasped and firmly retained by the respective seed retention claw 260, as controlled by the master control system 700. Moreover, the each seed is securely retained by the respective seed retention claw 260 having the 'tip' of each seed pointing anywhere within a 360° plane that is substantially orthogonal to the respective orientation pedestal shaft 220. Additionally, in various implementations, the master control system 700 controls the pressure exerted on each seed by the respective gripping fingers 264 such that each seed is firmly retained by each respective seed retention claw 260 without damaging the seeds or compromising the integrity and germination viability of the seeds, e.g., without damaging the seed embryos.

Referring now to FIG. 2D, in various embodiments, each orientation pedestal 204 can include a micro needle 268 connected to the distal end of the shaft 220 that is rotatable by the motor 224. In such embodiments, when a seed is transferred to an orientation pedestal 204, as described below, the seed is stuck or impaled by the respective micro needle 268 to retain the seed thereon. Moreover, the each seed is securely retained on the respective micro needle 268 having the 'tip' of each seed pointing anywhere within a 360° plane that is substantially orthogonal to the respective orientation pedestal shaft 220. Furthermore, by virtue of the very small diameter, e.g., 0.02 mm to 0.07 mm, of each micro needle 268 each seed is firmly retained one each respective micro needle 268 without damaging the seeds or compromising the integrity and germination viability of the seeds, e.g., without damaging the seed embryos.

Referring now to FIG. 2E, in various embodiments, each orientation pedestal 204 can include an air dispersion head 272 connected to the distal end of the shaft 220 that is rotatable by the motor 224. Each air dispersion head 272 is communicatively connected to an air source (not shown) that is controlled by the master control system 700 to selectively provide a flow of air at a face 276 of each air dispersion head 272. The face 276 of each air dispersion head 272 includes a plurality of orifices (not shown) such that the flow of air can be dispersed across each respective face 276. More particularly, in such embodiments, when a seed is transferred to an orientation pedestal 204 from the seed loading station 100, as described below, the flow of air dispersed across the face 276 of the respective air dispersion head 272 provides a cushion of air that slightly levitates each respective seed and steadily retains each respective seed above the respective air dispersion head 272. Moreover, each air dispersion head 272 retains each seed such that the 'tip' of each seed is pointing anywhere within a 360° plane that is substantially orthogonal to the respective orientation pedestal shaft 220. Additionally, the cushion of air provided at each air dispersion head 272 firmly retains each respective seed on the respective orientation pedestal 204 without damaging the seeds or compromising the integrity and germination viability of the seeds, e.g., without damaging the seed embryos.

As best shown in FIGS. 2 and 4, in various embodiments, the seed singulator 104 is slidably mounted to a linear stage 108 such that the seed singulator 104 can be translated along a length of the linear stage 108 to selectively position a dispending end 128 of the seed transfer tube 124 above the seed seat 216 of each orientation pedestal 204. In various implementations, the linear stage 108 includes a translating track 132 and an actuator 136 operable to bidirectionally move a carriage 138, to which the seed singulator 104 is mounted, along the length of the translating track 132. The master control system 700 is operable to control and coordinated the operations of the seed singulator 104, as described above, and the movement of the seed singulator 104 along the linear stage 108 to sequentially deposit a single seed onto the seed seat 216 of each orientation pedestal 204, via the seed transfer tube 124.

Figure 4A:
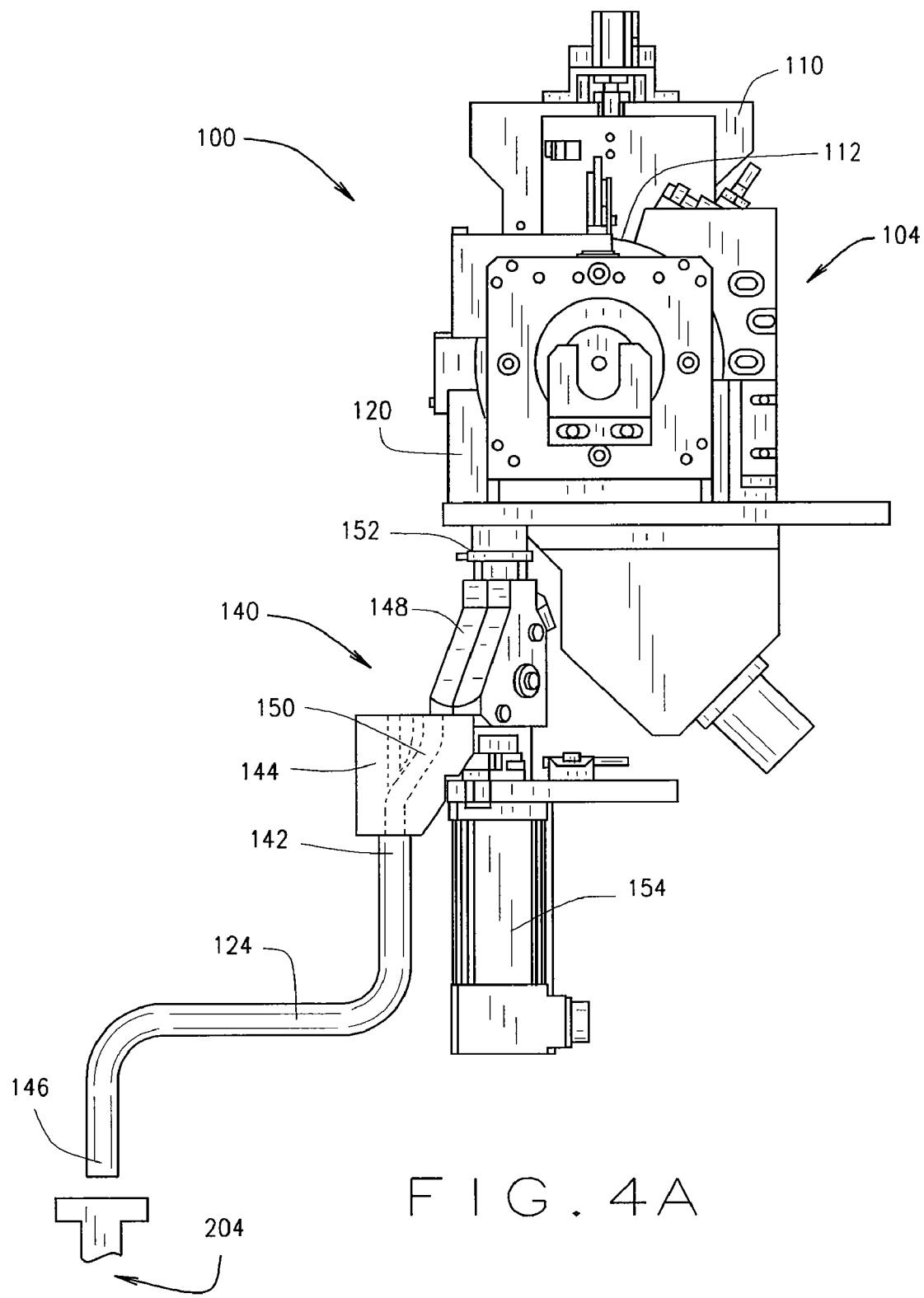
FIG. 4A is a side view of the seed loading station of the seed sampling subsystem shown in FIGS. 1, 2 and 3, illustrating a seed singulator and diverter assembly, in accordance with various embodiments of the present disclosure.

Referring now to FIG. 4A, in various embodiments, the seed singulator 104 is stationarily mounted to system support structure and the seed loading station 100 includes a rotary diverter assembly 140. The rotary diverter assembly 140 is controllable by the master control system 700 to sequentially divert each seed singulated by seed singulator 104 into one of a plurality of seed transfer tubes 124. A proximal end 142 of each transfer tube 124 is connected to the a diverter block 144 of the diverter assembly 140, and a distal end 146 of each transfer tube is stationarily positioned above a corresponding one of the orientation pedestals 204. More particularly, the diverter assembly 140 additionally includes a rotary diverter head 148 that is controllable by the master control system 700 and a rotary motor 154, e.g., a servomotor, to direct each respective singulated seed into one of a plurality of diverting passages 150 extending through the diverter block 144. The diverter head 148 is rotationally connected to the seed collector 120 via a rotatable collar 152. Thus, as a seed is removed from the separating wheel 112, as described above, the seed travels through the seed collector 120 and the rotatable collar 152 into an internal channel (not shown) of the diverter head 148. As each seed is singulated, the master control system 700 incrementally rotates the diverter 148, via the motor 154, about a longitudinal axis of the rotatable collar 152 to sequentially position a dispensing end of the diverter head internal channel in coaxial alignment with each of the diverting passages 150. Accordingly, each singulated seed will be diverted to a corresponding one of the seed transfer tubes, and thereby deposited onto a corresponding one of the orientation pedestals 204.

Referring now to FIGS. 3 and 4, the imaging device(s) 208 is/are mounted to support structure above the orientation pedestals 204 such that each of the orientation pedestals 204, more particularly, the seed seat 216 of each of the orientation pedestals 204, is within the field of view of one or more of the imaging device(s) 208. Accordingly, as each seed is deposited onto a respective seed seat 216, the seed is placed within the field of view of one or more of the imaging device(s) 208. Subsequently, the respective imaging device(s) 208 acquire(s) orientation image data of each seed that is communicated to the master control system 700. The imaging device 208 can be any imaging device suitable for collecting images of the seeds deposited onto the orientation pedestals 204. For example, in various embodiments, the imaging device 208 can comprise a high speed, high resolution digital camera, such as a disruptive visual technology (DVT) machine vision camera for collecting visual digital image data of each seed. Alternatively, the image data collected can be near infra-red (NIR) image data, NMR/MRI image data, or any other type image data.

As described above, when a seed is deposited onto the orientation pedestal 204, each seed is oriented such that the 'tip' of each seed is pointing anywhere within a 360° plane that is substantially orthogonal to the respective orientation pedestal shaft 220. The image data collected is communicated to the master control system 700, where upon execution of an orientation algorithm, the image data is analyzed to determine the orientation of each seed, e.g., which direction the 'tip' and/or the 'Crown' of each seed is pointing as it sets on the respective orientation pedestal seat 216. For example, in various embodiments, execution of the orientation algorithm, e.g., a vector determining algorithm, can determine a location of a centroid of each seed and identify the farthest point from the centroid of the respective seed as the seed 'tip' and the end of the respective seed opposite the 'tip' as the 'Crown' of the respective seed. Subsequently, based on the determined orientation of each respective seed, the master control system 700 will position each seed in a desired orientation. That is, the master control system 700 will rotate each respective orientation device shaft 220, via the motors 224, to orient each seed such that either the 'tip' or the 'Crown' of each seed pointing in a desired direction, e.g., orthogonally toward or orthogonally away from a front edge 308 of the sampling subsystem 300 (shown in FIG. 5). Orienting the seeds in the proper position minimizes the impact to the seed's germination viability when a sample is removed from the seed, as described below.

Referring now to FIGS. 3 and 4, in various embodiments, once each seed is positioned in the desired orientation, each seed is moved to the sampling subsystem 300, via the pick and place device bank 212. In various embodiments, the pick and place device bank 212 includes a plurality of pick and place devices 232, i.e., a number of pick and place devices 232 equal to the number of orientation devices 204. Similarly, the sampling subsystem 300 includes a number of sampling retention fixtures 304 equal to the number of orientation devices 204.

Each pick and place device 232 includes at least one seed picker 236 coupled to an actuator arm 240 of a linear and rotary actuator 244 that is controlled by the master control system 700. In operation, once each seed is oriented in the desired orientation, as described above, the master control system 700 will operate each respective actuator 244 to position an extraction tip 248 of each seed picker 236 directly above the respective seed retained by the respective seed orientation pedestal 204. The master control system 700 will then control each respective actuator 244 to lower the respective actuator arm 240 and seed picker 236 connected thereto such that the extraction tip 248 can grasp the respective seed.

Once each seed is grasped, i.e., secured or retained, by the respective extraction tip 248, the master control system 700 will control each actuator 244 to raise the respective actuator arm 240 and seed picker 236 connected thereto such that the respective seed is lifted from the respective seed seat 216. Thereafter, via control by the master control system 700, each actuator 244 moves each respective seed to a position directly above the corresponding sampling retention fixture 304. Subsequently, the master control system 700 will control each actuator 244 to lower the respective actuator arm 240 and seed picker 236 connected thereto such that the extraction tip 248 can place each respective seed into the corresponding sampling retention fixture 304, whereby each seed is held and a sample is removed, as described below. Particularly, utilizing orientation data, the master control system 700 will orient each seed on the respective orientation pedestal 204 such that each seed will be placed into the corresponding sampling retention fixture 304 having the portion of the seeds containing the embryo, i.e., the 'tip', pointed away from a cutting device 340 associated with each respective sampling retention fixture 304. Accordingly, when placed into one of the sampling retention fixtures 304, each seed will be positioned such that the 'Crown' of each seed is pointed toward, or facing, the corresponding cutting device 34. Therefore, each sample will be removed from the 'Crown' of each respective seed, containing the cotyledon and/or endosperm tissue of the seed, as described below, so that the germination viability of each seed is preserved.

The pick and place device extraction tips 252 can be any tip or device that is suitable to grasp, or pick up, the seeds from the seed seats 216 and place each seed into a respective one the sampling subsystem sampling retention fixtures 304 without compromising the integrity and germination viability of the seeds, e.g., without damaging the seed embryos. For example, in various embodiments, each extraction tip 248 can comprise a vacuum nozzle whereby a vacuum is utilized to lift and retain each respective seed as the seed is removed from the respective seed orientation pedestal 204 and placed in the corresponding sampling retention fixture 304. Alternatively, each extraction tip 248 can comprise a mechanical claw, a micro needle or any other holding device that will not compromise the integrity and germination viability of the seeds as the seeds are transferred from the orientation pedestals 204 to the corresponding sampling retention fixtures 304. Additionally, in various embodiments, the actuators 244 can be operable to rotate the respective actuator arms 240, either independently or in unison, to transfer the seeds from the respective seed seats 216 to the corresponding sampling retention fixtures 304. Alternatively, the pick and place device 212 is structured and operable to laterally move each pick and place device 232 between the orientation subsystem 200 and the sampling subsystem 300, either independently or in unison, to transfer the seeds from the respective seed seats 216 to the corresponding sampling retention fixtures 304.

Although the orientation subsystem 200 has been described and illustrated herein to utilize the pick and place devices 232 to transfer the seed from the orientation pedestals 204 to the sampling retention fixtures 304, any suitable mechanism can be utilized to do so and remain within the scope of the present disclosure. For example, it is envisioned that the orientation subsystem 200 can include any suitable apparatus, device, assembly, etc., structured and operable to rotate, flip, slide or otherwise move each seed from the orientation pedestals 204 to the sampling retention fixtures 304 such that the 'tip' of each seed faces away from the cutting device 340 associated with each respective sampling retention fixture 304.

Referring now to FIGS. 2, 3, 4 and 5, in various embodiments, the sampling subsystem 300 includes a base platform 312 mounted to system support structure and to which the sampling retention fixtures 304 are mounted. The sampling subsystem 300 further includes a plurality of sampling assemblies 316, i.e., a number of sampling assemblies 316 equal to the number of sampling retention fixtures 304.

Generally, in operation, each seed is held within the respective sampling retention fixture 304 and a sample of each seed is removed from the 'Crown', e.g., a portion of each seed containing the cotyledon and/or endosperm tissue, by the corresponding sampling assembly 316 without damaging the seeds or compromising the germination viability or integrity of the seeds. Each sampled seed is then transferred to the seed collection assembly 500, and each corresponding removed sample is transferred to the sample collection assembly 600, via the seed and sample transport subsystem 400, as described below.

In various embodiments, each sampling retention fixture 304 comprises a gripper block 320 structured to slide on a rail 324, e.g., a track or dovetail, between a seed receiving position and a seed sampling position, as controlled by the master control system 700. In various implementations, each gripper block 320 includes a seed channel 328 and a pair of opposing clamping fingers 332. The clamping fingers 332 are movable, as controlled by the master control system 700, between an opened position, in which seeds can be placed between the clamping fingers 332 by the respective pick and place device 232, and a closed position, in which the clamping fingers 332 securely hold each respective seed for sampling by the corresponding sampling assembly 316.

Thus, in various embodiments, the pick and place devices 232 will remove seeds from the respective orientation pedestals 204 and then place the seeds within the seed channel 328 and between the clamping fingers 332 of the respective gripper block 320 that has been moved to the seed receiving position. Subsequently, the master control system 700 will control the operation of the gripper blocks 320 to move the clamping fingers 332 to the closed position and the gripper blocks 320 to the seed sampling position. It should be understood that when each seed has been placed in and retained by the respective gripper block 320, and the gripper blocks 320 have been moved to the seed sampling position, a portion of each seed is sufficiently exposed to allow the corresponding sampling assembly 316 to remove, or extract, a sample from each respective seed. For example, in various embodiments, at portion of the 'Crown' of each respective seed is exposed such that a sample can be removed from the 'Crown' without interference by the respective gripper blocks 320.

In various implementations, using the imaging data obtained by the orientation subsystem 200, the sampling position for each gripper block 320 is independently determined by the master control system 700 such that only a desired amount of sample is removed or extracted from each respective seed. That is, the distance each gripping block 320 travels along the respective rail 324 can be independently and dynamically controlled to position each respective seed relative to the corresponding sampling assembly 316 such that only a desired amount of each seed is removed or extracted as the sample.

In various embodiments, each sampling assembly 316 includes a rotary drive motor 336 operable to control the movement of a cutting device 340 to remove or extract the sample, e.g., tissue sample, from each respective seed. In various implementations the cutting devices 340 comprise cutting blades that are connected to shafts of the drive motors 336 such that rotation of the shafts will move the respective cutting blades in an arced up-and-down guillotine-like motion to cut the respective seed and remove the samples. In various other implementations the cutting blades can be connected to the shafts of the drive motors 336 via a cam device such that rotation of each shaft will move the respective cutting blade in an up-and-down-and-across slicing motion to remove the respective samples. The cutting blades can comprise any cutting blade suitable to cut the seeds in accordance of the cutting motion imparted by the respective drive motor 336 without crushing the seeds and damaging the embryos, thereby compromising the integrity and germination viability of the seeds. For example, in various embodiments, the cutting blade can comprise a blade similar to a utility knife blade or a scalpel.

Once each sample has been removed or extracted from a seed, the respective drive motor 336 will return the respective cutting device 340 to a ready to cut position for the next seed. In various implementations, each drive motor 336 needs only to rotate about 30 degrees to cut the respective seed to remove the sample.

As described above, the orientation subsystem 200 utilizes the orientation data to orient each seed on the respective orientation pedestals 204 so that each seed is placed into the corresponding sampling retention fixture 304 having the 'Crown' of each seed facing, or pointing toward, the respective cutting device 340, and 'tip' of each seed pointing away from the respective cutting device 340. Therefore, each sample will be removed from the 'Crown' of each seed so that the respective seed embryos will not be damaged and the germination viability of each seed will be preserved. Additionally, as described herein, the master control system 700 spatially positions the 'Crown' of each seed with regard to each corresponding cutting device 340 such that only a desired amount of the 'Crown' of each seed is removed to thereby preserve the germination viability of each seed.

Figure 6:
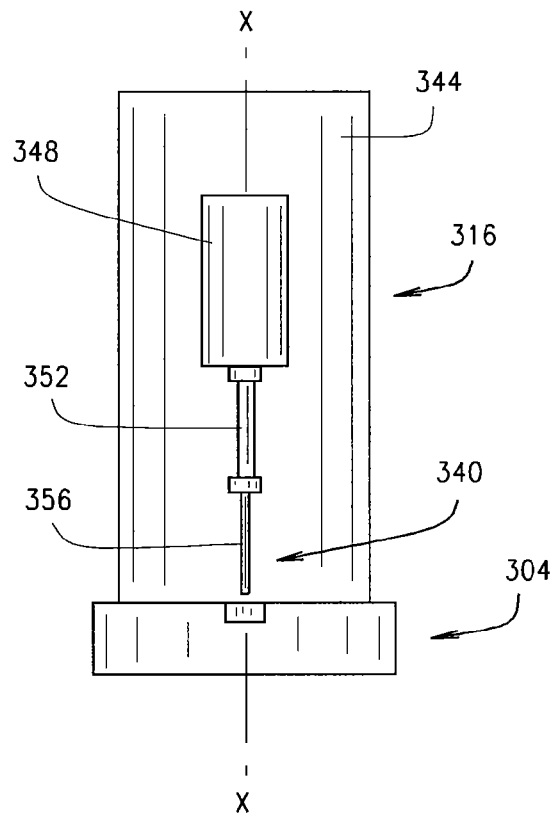
FIG. 6 is a front view of a linear actuated seed sampling assembly of the seed sampling subsystem shown in FIG. 1, in accordance with various embodiments of the present disclosure.

Referring now to FIG. 6, in various embodiments, each sampling assembly 316 can comprise a linear actuated seed sampling device 344 that includes a linear actuator 348 controllable by the master control system 700 to bidirectionally move a drive rod 352 along a longitudinal axis X of the linear actuator 348. Additionally, in various embodiments, each cutting device 340 can comprise a sample extraction bit 356 connected to a distal end of the respective drive rod 352. The sample extraction bit 356 is structured to remove or extract samples from each respective seed. More particularly, once a seed is retained within a sampling retention fixture 304, the master control system 700 can control the operation of the respective linear actuator 348 to move the respective sample extraction bit 356 into contact with the respective seed such that the sample extraction bit 356 removes a sample from the seed.

For example, in various embodiments, the sample extraction bit 356 can be a hollow cutting tube, such as a biopsy punch, cork borer, or similar device the will be pushed through each seed, via the linear actuator 348, to perforate each seed and extract the samples. In other embodiments, each linear actuator 348 can comprise a rotary linear actuator and each sample extraction bit 356 can comprise a cutting spin bit. Accordingly, the master control system 700 can control the linear actuator 348 to simultaneously rotate, e.g., spin, the cutting spin bit and move the respective sample extraction bit 356 into contact with the respective seed to drill a hole in each seed and extract the samples.

Figure 7:
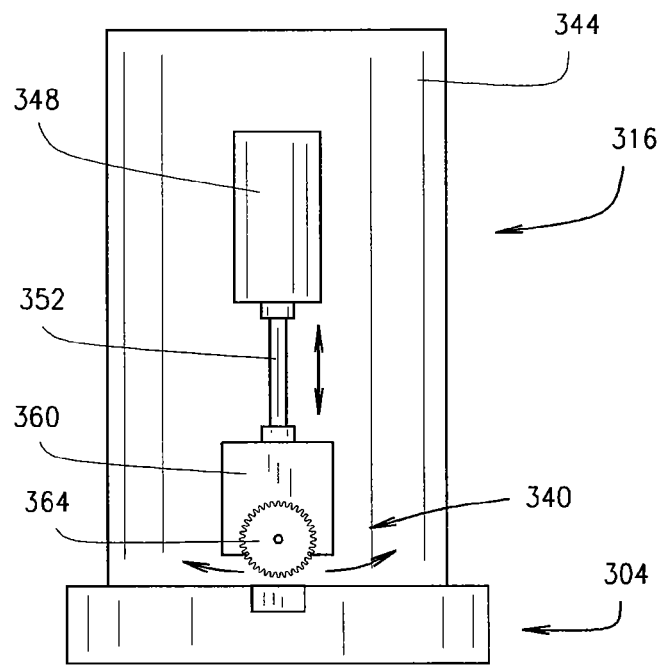
FIG. 7 is a front view of the linear actuated seed sampling assembly shown in FIG. 6, in accordance with various other embodiments of the present disclosure.

Referring now to FIG. 7, in various embodiments, each cutting device 340 can comprise a rotary motor 360 connected to the distal end of the respective drive rod 352 a rotary cutting blade 364 connected to a shaft of the respective motor 360. In such embodiments, once a seed is retained within a sampling retention fixture 304, the master control system 700 can control the operation of the respective linear actuator 348 and motor 360 to rotate the cutting blade 364 and move the rotating cutting blade 364 into contact with the respective seed to cut a sample from the seed.

Each cutting device 340 can comprise and device suitable to remove or extract a desired amount of each seed to provide a sample, e.g., a tissue sample, of each seed. For example, in various embodiments, each cutting device 340 can comprise an air knife, a laser, a water jet, vibrating blade or bit, or any other cutting device suitable to remove the desired sample each seed.

Furthermore, in various embodiments, each cutting device 340 and include a plurality of cutting blades, extraction bits, rotary cutting blades, air knifes, lasers, water jets, vibrating blades or bits, etc., such that a plurality of portions of each seed are removed. For example, in various embodiments, each cutting device can include two cutting blades, extraction bits, rotary cutting blades, etc. In such embodiments, the master control system 700 can control the operation of the sampling assemblies 316 and the sampling retention fixtures 304 to remove and discard a first portion of each seed comprising the skin or coat of each seed, and subsequently or simultaneously remove or extract a second portion of each seed comprising tissue, e.g., cotyledon and/or endosperm, usable as the sample and suitable for genetic analysis, as described below.

Alternatively, in various embodiments, a plurality of portions of each seed can be removed utilizing cutting devices comprising a single cutting blade, extraction bit, rotary cutting blade, etc. For example, in such embodiments, the master control system 700 can control the operation of the sampling assemblies 316 and the sampling retention fixtures 304 to remove and discard a first portion of each seed, thereby removing and discarding a portion of the skin or coat of each seed. Subsequently, the master control system 700 can control the operation of the sampling assemblies 316 and the sampling retention fixtures 304 to remove or extract a second portion each seed comprising tissue, e.g., cotyledon and/or endosperm, usable as the sample suitable for genetic analysis, as described below.

Additionally, in various embodiments, the master control system 700 can control the operation of the sampling assemblies 316 and the sampling retention fixtures 304 to remove different sample sizes or amounts from each respective seed. That is, the master control system 700 can position the 'Crown' of each seed any particularly distance from the respective cutting device 340 so that any a desired amount of size of sample can be removed, or extracted.

It should be understood that each sampling retention fixture 304 is structured and operable to firmly retain each respective seed such that each respective seed does not move and is not damaged or the germination viability of each respective seed compromised as the corresponding sampling assembly 316 removes a sample from each seed. For example, with exemplary reference to FIG. 5, in various embodiments, each clamping finger 332 can be fabricated from, or include a layer of, pliable material such as rubber or other synthetic rubber-like material that will aid in firmly and securely holding each respective seed between the clamping fingers 332 without damaging the seed embryos and compromising the germination viability or integrity of the seeds, e.g., without damaging the seed embryos.

Figure 8A:
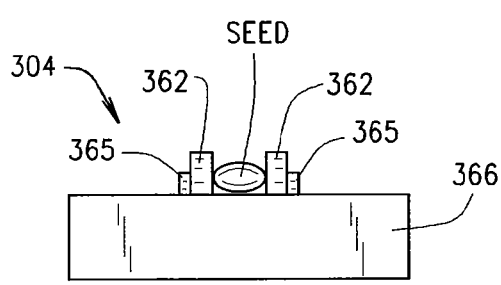
FIG. 8A is a front view of a sampling retention fixture of the seed sampling subsystem shown in FIG. 1, in accordance with various embodiments of the present disclosure.

Referring now to FIG. 8A, in various embodiments, each sampling retention fixture 304 can comprise a pair of opposing pliable paddles 362 coupled to actuators 365 mounted on a base 366. In such embodiments, as each seed is transferred from the orientation subsystem 300 and placed between the pliable paddles 362, the master control system 700 controls the actuators 365 to firmly grasp and hold each respective seed between pliable paddles 362. The pliable paddles 362 can be fabricated from any pliable material such as rubber or other synthetic rubber-like material that will aid in firmly and securely holding each respective seed between the pliable paddles 362 without damaging the seeds or compromising the germination viability or integrity of the seeds.

Figure 8B:
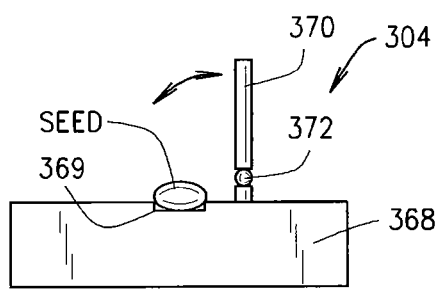
FIG. 8B is a front view of a sampling retention fixture of the seed sampling subsystem shown in FIG. 1, in accordance with various other embodiments of the present disclosure.

Referring now to FIG. 8B, in various other embodiments, each sampling retention fixture 304 can comprise a grooved base 368 including a recessed seed channel 369 and a pliable hood 370 pivotally connected to the base 368 via a rotary actuator 372. In such embodiments, as each seed is transferred from the orientation subsystem 300 and placed into the seed channel 369, the master control system 700 controls the rotary actuator 372 to position the pliable hood 370 in contact with each respective seed, thereby firmly holding each respective seed within the respective seed channel 369. The pliable hood 370 can be fabricated from any pliable material such as rubber or other synthetic rubber-like material that will aid in firmly and securely holding each respective seed within the seed channel 369 without damaging the seeds or compromising the germination viability or integrity of the seeds.

Figure 8C:
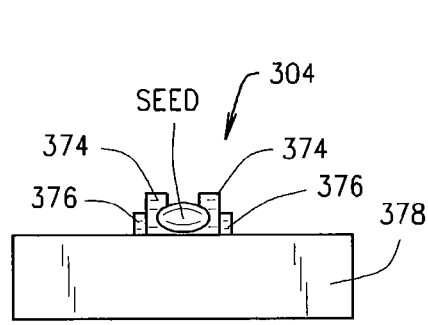
FIG. 8C is a front view of a sampling retention fixture of the seed sampling subsystem shown in FIG. 1, in accordance with still other various embodiments of the present disclosure.

Referring now to FIG. 8C, in various embodiments, each sampling retention fixture 304 can comprise a pair of opposing grooved paddles 374 coupled to actuators 376 mounted on a base 378. In such embodiments, as each seed is transferred from the orientation subsystem 300 and placed between the grooved paddles 374, the master control system 700 controls the actuators 376 to firmly grasp and hold each respective seed between grooved paddles 374. Accordingly, each respective seed will be firmly and securely held within the grooves of the grooved paddles 374 without damaging the seeds or compromising the germination viability or integrity of the seeds.

Figure 8D:
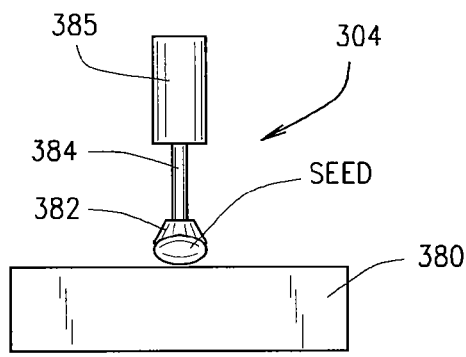
FIG. 8D is a front view of a sampling retention fixture of the seed sampling subsystem shown in FIG. 1, in accordance with yet other various embodiments of the present disclosure.

Referring now to FIG. 8D, in various other embodiments, each sampling retention fixture 304 can comprise a base 380 including and a vacuum cup 382 mounted to a distal end of a drive rod 384 of a linear actuator 385. In such embodiments, as each seed is transferred from the orientation subsystem 300 and placed on the base 380, the master control system 700 controls the linear actuator 385 to position the vacuum cup 382 in contact with each respective seed. A vacuum is then provided at the respective vacuum cup 382. Accordingly, each respective seed will be firmly and securely held within the respective vacuum cup 382 and on the respective base 380 without damaging the seeds or compromising the germination viability or integrity of the seeds.

Figure 5:
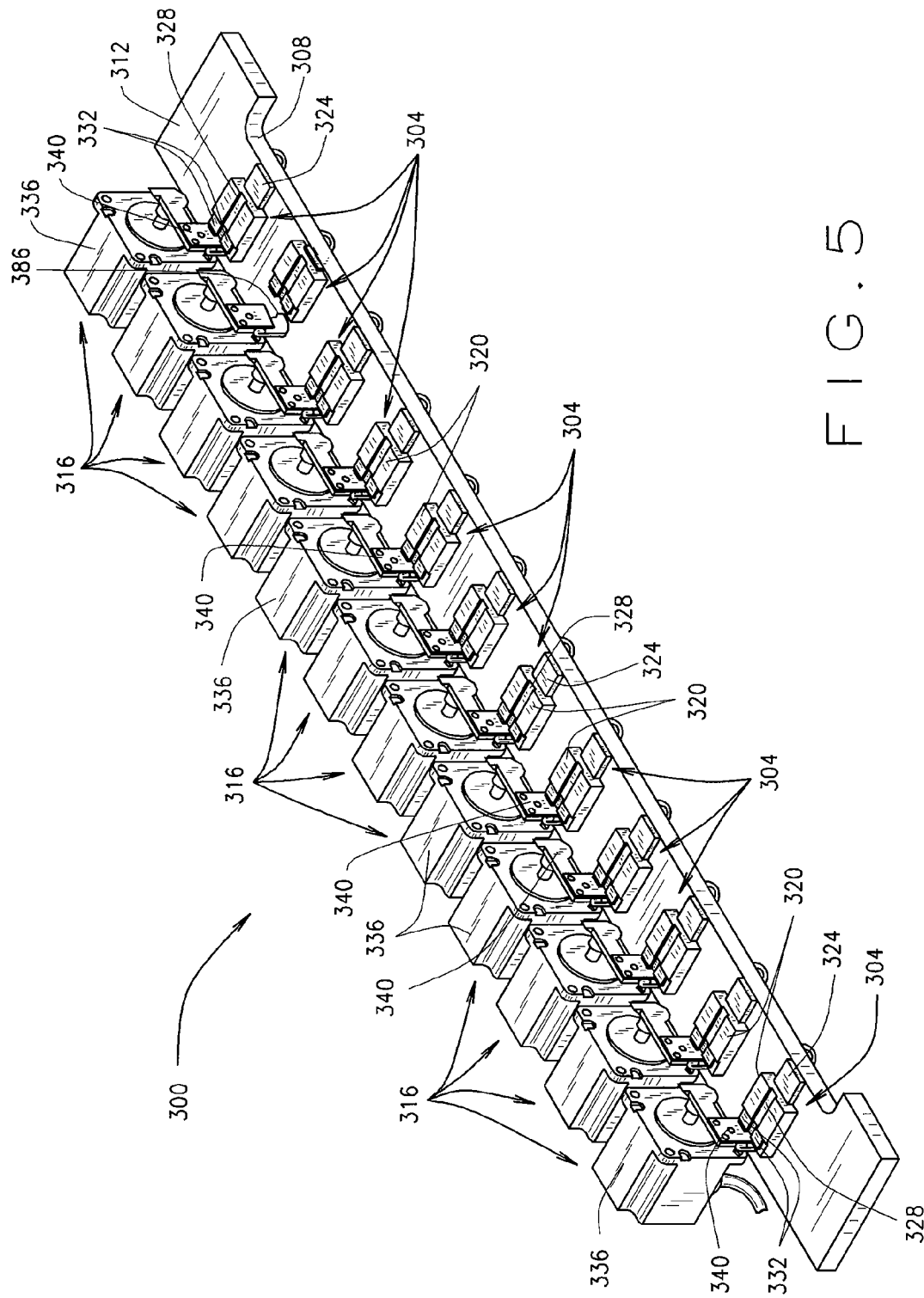
FIG. 5 is an isometric view of the seed sampling subsystem shown in FIGS. 1, 2, 3 and 4, in accordance with various embodiments of the present disclosure.
Figure 8E:
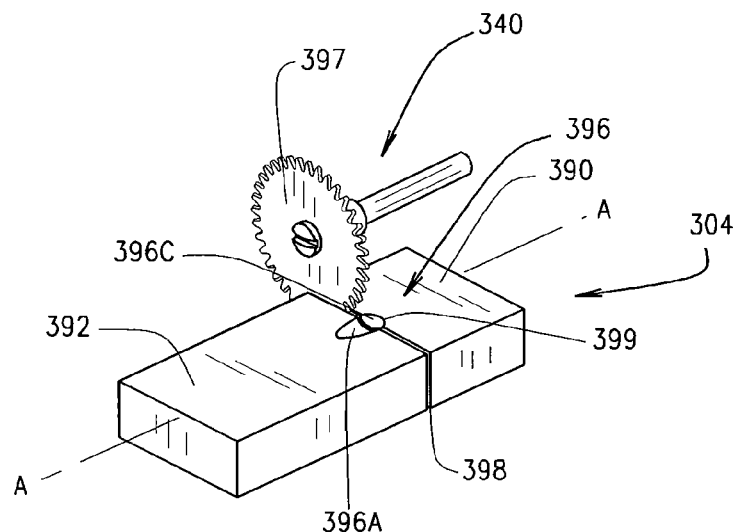
FIG. 8E is an isometric view of a sampling retention fixture of the seed sampling subsystem shown in FIGS. 1, 2, 3 and 4, in accordance with various embodiments of the present disclosure.
Figure 8F:
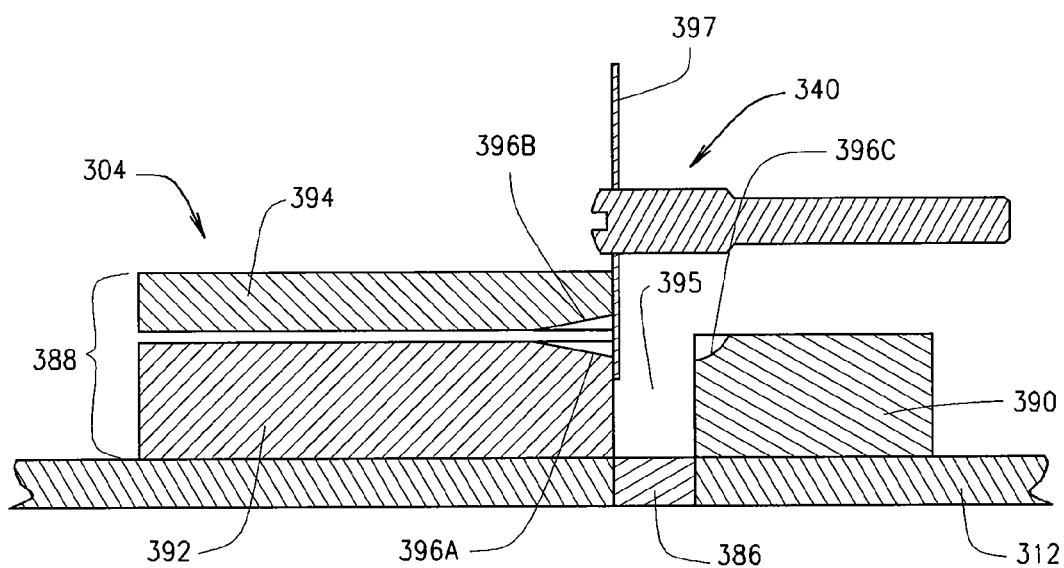
FIG. 8F is a cross-sectional view of the sampling retention fixture shown in FIG. 8A, along line A-A, in accordance with various embodiments of the present disclosure.

Referring now to FIGS. 5, 8E and 8F, in various embodiments, each sampling retention fixture 304 can comprise a clamping block 388 fixedly mounted to the base platform 312 and including a base 392 and a cover 394 for retaining seeds during sampling. Additionally, each sampling retention fixture 304 can include a datum block 390 slidingly mounted to the base platform 312 that is structured and operable to align each seed within the respective clamping block such that a particular desired amount of each seed is removed during sampling. A top surface of each clamping block base 932 includes a first tail portion 396A of a seed nest 396, a bottom surface of each respective clamping block cover 394 includes a second tail portion 396B of the respective seed nest 396, and a top surface of each datum block 390 includes a head portion 396B of the respective seed nest 396. In such embodiments, each clamping block cover is initially placed in an 'Opened' position, as controlled by the master control system 700, providing access to the first tail portion of 396A of the respective seed nest 396. Additionally, and each datum block 390 is initially placed in a 'Sampling' position, as controlled by the master control system 700, wherein each datum block 390 is placed in close proximity to the respective clamping block base 392. When each datum block 390 is placed in the 'Sampling' position, a cutting gap 398 is provided between the respective clamping block base 392 and the datum block 390, and each datum block 390 substantially covers the respective extraction aperture 386.

With the clamping block cover 394 of any sampling retention fixture 304 in the 'Opened' position and the datum block 390 in the 'Sampling' position a seed can be transferred from the orientation subsystem 300 and placed into the respective seed nest 396, i.e., the first tail portion 396A and the head portion 396C of the respective seed nest 396. More particularly, each seed is placed into a respective seed nest 396 such that the 'Crown' of each seed abuts a distal end 399 of the respective seed nest head portion 396C, thereby consistently and accurately aligning the 'Crown' of each seed relative to the cutting gap 398. Accordingly, each cutting device 340 will consistently and accurately remove only a specific sample amount of each seed, as described below.

Once a seed has been placed into the respective seed nest 396, i.e., the first tail portion 396A and the head portion 396C of the respective seed nest 396, the master control system 700 commands the respective clamping block cover 394 to a 'Closed' position, whereby each respective seed is firmly retained within the seed nest 396 without damaging the seeds or compromising the germination viability or integrity of the seeds, i.e., without damaging the seed embryos.

Furthermore, in such embodiments, the cutting device 340 can comprises a rotary cutting blade 364 structured and operable, via an associated motor (not shown) and control of the master control system 700, to rotate and bidirectionally move vertically and/or horizontally with respect to the clamping block 388 to remove each respective sample. More particularly, the rotary cutting blade 364 can be structured and operable to rotate at a high velocity and traverse through each respective seed along the pathway provided by the cutting gap 398.

Once a seed has been sampled, the respective datum block 390 is moved, as controlled by the master control system 700, away from the corresponding clamping block base 392, to an 'Extraction' position, thereby uncovering the respective extraction aperture 386 and creating an extraction gap 395 between the clamping block base 392 and the datum block 390. The seed sample is then extracted, via gravity, vacuum and/or forced air, from the head portion 396C of the seed nest 396 through the extraction aperture 386 and deposited into one of the sample collection trays 604, e.g., microplates, as described below. Subsequently, the master control system 700 commands the clamping block cover 394 to the 'Opened' position allowing the sampled seed to be extracted via gravity, vacuum and/or forced air, from the first tail portion 396A of the seed nest 396 through the extraction aperture 386 and to be deposited into one of the seed collection trays 504, as described below.

In various implementations, the clamping block cover 394 can be fabricated from, or include a liner fabricated from, a pliable material such as rubber or other synthetic rubber-like material that will aid in firmly and securely holding each respective seed within the seed nest 396 without damaging the seeds or compromising the germination viability or integrity of the seeds. Alternatively, in other implementations, the clamping block cover 394 can comprise a pliable flat cover, i.e., absent the second tail portion 396B of the seed nest 396, such as that described above with regard to FIG. 8B.

Moreover, it is envisioned that any combination of the sampling retention fixture 304 embodiments described above with reference to FIGS. 8A, 8B, 8C, 8D, 8E and 8F can be utilized to firmly and securely hold each seed during sampling without damaging the seeds or compromising the germination viability or integrity of the seeds.

Referring now to FIG. 2, each seed collection tray 504 includes a plurality of seed wells 506, each of which are adapted for receiving a seed dispensed from the seed and sample transport subsystem 400, as described below. For example, in various embodiments, each seed collection tray 504 can include twenty-four wells 506. Similarly, each sample collection tray 604 includes a plurality of sample wells 606, each of which are adapted for receiving a sample dispensed from the seed and sample transport subsystem 400, as described below. For example, in various embodiments, each sample collection tray 604 can comprise a microplate including ninety-six micro wells 606.

Once a seed has been sampled, the seed and sample are deposited into the seed collection assembly 500 and the sample collection assembly 600, respectively, via the seed and sample transport subsystem 400. Moreover, the seed and sample transport subsystem 400 is controllable by the master control system 700 to sort the sampled seeds to the seed collection trays 504 and sort the corresponding seed sample to the sample collection trays 604 while tracking and mapping the locations of the corresponding sampled seeds and seed samples in the respective seed and sample collection trays 504 and 604.

As described above, in various embodiments, the seed and sample transport subsystem 400 includes a plurality of diverter assemblies 404. More particularly, the seed and sample transport subsystem 400 includes a number of diverter assemblies 404 equal to the number of sampling assemblies 316. Moreover, each diverter assembly 404 is mounted, via system support structure, adjacent a corresponding one of the sampling assemblies 316 such that as each sampling assembly 316 removes a sample from a seed, the sample and sampled seed are sequentially deposited into the respective diverter assembly 404.

The seed and sample transport subsystem 400 additionally includes a number seed deposit tubes 408 equal to the number of diverter assemblies 404. Each seed deposit tube 408 includes a proximal end connected to a respective one of the diverter assemblies 404 and an opposing distal end positioned above a seed tray platform 508 of the seed collection assembly 500. The seed tray platform 508 is structured to removable retain a plurality of the seed collection trays 504 in fixed positions and orientations. Furthermore, the seed and sample transport subsystem 400 includes a number of sample deposit tubes 412 equal to the number of diverter assemblies 404. Each sample deposit tube 412 includes a proximal end connected to a respective one of the diverter assemblies 404 and an opposing distal end positioned above a sample tray platform 608 of the sample collection assembly 600. The sample tray platform 608 is structured to removable retain a plurality of the sample collection trays 604 in fixed positions and orientations.

Each diverter assembly 404 is structured and operable, via control by the master control system 700, to divert seed samples into the corresponding sample deposit tube 412, and divert the corresponding sampled seeds into the seed deposit tube 408. Generally, as a seed is sampled, the respective sample is extracted, via gravity, vacuum and/or forced air into the corresponding diverter assembly 404, whereby the master controller 700 commands the diverter assembly 404 to divert the sample into the respective sample deposit tube 412. The respective sample is then transferred, via gravity, vacuum and/or forced air, through the sample deposit tube 412 and is deposited into a selected one of the wells 606 of a selected one of the sample collection trays 604 removably mounted to the sample tray platform 608. Similarly, the respective sampled seed is subsequently extracted, via gravity, vacuum and/or forced air into the corresponding diverter assembly 404, whereby the master controller 700 commands the diverter assembly 404 to divert the sampled seed into the respective seed deposit tube 408. The respective sampled seed is then transferred, via gravity, vacuum and/or forced air, through the seed deposit tube 408 and is deposited into a selected one of the wells 506 of a selected one of the of seed collection trays 504 removably mounted to the seed tray platform 508.

For example, with reference to FIGS. 3 and 5, in various embodiments, the sampling subsystem base platform 312 can include a plurality of extraction apertures 386, wherein each extraction aperture 386 is located directly beneath a corresponding one of the cutting devices 340. Additionally, an inlet tube 416 of each diverter assembly 404 is connected to a bottom of the sampling subsystem base platform 312 at a corresponding one of the extraction apertures 386. Therefore, as a seed is sampled, the respective sample is extracted, via gravity, vacuum and/or forced air through the respective extraction aperture 386 and into the corresponding diverter assembly 404, via the respective inlet tube 416. The extracted sample is then diverted into the respective sample deposit tube 412, via the diverter assembly 404, and deposited into a particular one of the wells 606 of a particular one of the sample collection trays 604. Subsequently, the corresponding sampled seed is extracted, via gravity, vacuum and/or forced air through the extraction aperture 386 and into the diverter assembly 404, via the inlet tube 416. The extracted sampled seed is then diverted into the sample deposit tube 412, via the diverter assembly 404, and deposited into a particular one of the wells 506 of a particular one of the seed collection trays 504.

To deposit each sample into a particular one of the wells 606 of a particular one of the sample collection trays 604, the sample tray platform 608 is mounted to a sample tray platform X-Y stage 612 that is a two-dimensional translation mechanism, including an X axis translating track 616 and a Y axis translating track 618. The sample tray platform X-Y stage 612 additionally includes a first linear actuator 620 operable to bidirectionally move a first carriage (not shown) along the length of the X axis translating track 616, and a second linear actuator 624 operable to bidirectionally move a second carriage (not shown) along the length of the Y axis translating track 618. The Y axis translating track 618 is mounted to the first carriage and the sample tray platform 608 is mounted to the second carriage. Additionally, the sample deposit tubes 412 are mounted, via system support structure, to position the distal ends above the sample tray platform X-Y stage 612 and the sample tray platform 608 holding the plurality of sample collection trays 604.

As each sample collection tray 604 is placed on the sample tray platform 608, a sample collection tray identification number, e.g., a bar code, for each sample collection tray 604 and the location of each respective sample collection tray 604 on the sample tray platform 608 is recorded in the master control system 700. Based on the recorded location of each sample collection tray 604 and the known number and configuration of wells 606 in each sample collection tray 604, the master control system 700 determines an X-Y coordinate location of each sample collection tray well 606 on the sample tray platform 608.

In coordination with the sampling of the seeds, the first and second linear actuators 620 and 624 of the sample tray platform X-Y stage 612 are controlled by the master control system 700 to move the sample tray platform 608 within an X-Y coordinate system to precisely position any one or more selected wells 606 of any one or more selected sample collection trays 604 at one or more target locations directly beneath the distal ends of any one or more of the sample deposit tubes 412. Therefore, each sample will be deposited into a particular, selected well 606 of the sample collection sample trays 604.

For example, in various embodiments, prior to the sampling subsystem 300 extracting samples from the respective seeds, as described above, the master control system 700 controls the sample tray platform X-Y stage 612 to position a selected group of wells 606 at the respective target locations beneath two or more of the sample deposit tubes 412. When the selected group of wells 606 is placed at the respective target locations, the distal ends of each sample deposit tube 412 is in alignment with and in close proximity to, or in contact with, a corresponding one of the wells 606 in the selected group. Subsequently, the master control system 700 commands the sampling subsystem 300 to extract the samples from the respective seeds. Each sample is then drawn into a corresponding diverter assembly 404 and transferred through the respective sample deposit tubes 412 to the corresponding selected sample collection tray well 606.

The master control system 700 then compares the X-Y location of each deposited extracted sample with the recorded positions of the wells 606 to map each extracted sample to the respective well 606 of the respective sample collection tray 604 in which each sample was deposited.

Similarly, to deposit each sampled seed into a particular one of the wells 506 of a particular one of the seed collection trays 504, the seed tray platform 508 is mounted to a seed tray platform X-Y stage 512 that is a two-dimensional translation mechanism, including an X axis translating track 516 and a Y axis translating track 518. The seed tray platform X-Y stage 512 additionally includes a first linear actuator 520 operable to bidirectionally move a first carriage (not shown) along the length of the X axis translating track 516, and a second linear actuator 524 operable to bidirectionally move a second carriage (not shown) along the length of the Y axis translating track 518. The Y axis translating track 518 is mounted to the first carriage and the seed tray platform 508 is mounted to the second carriage. Additionally, the seed deposit tubes 408 are mounted, via system support structure, to position the distal ends above the seed tray platform X-Y stage 512 and the seed tray platform 508 holding the plurality of seed collection trays 504.

As each seed collection tray 504 is placed on the seed tray platform 508, a seed collection tray identification number, e.g., a bar code, for each seed collection tray 504 and the location of each respective seed collection tray 504 on the seed tray platform 508 is recorded in the master control system 700. Based on the recorded location of each seed collection tray 504 and the known number and configuration of wells 506 in each seed collection tray 504, the master control system 700 determines an X-Y coordinate location of each seed collection tray well 506 on the seed tray platform 508.

In coordination with the sampling of the seeds, the first and second linear actuators 520 and 524 of the seed tray platform X-Y stage 512 are controlled by the master control system 700 to move the seed tray platform 508 within an X-Y coordinate system to precisely position any one or more selected wells 506 of any one or more selected seed collection trays 504 at one or more target locations directly beneath the distal ends of any one or more of the seed deposit tubes 408. Therefore, each sampled seed will be deposited into a particular, selected well 506 of the seed collection trays 504.

For example, in various embodiments, prior to the sampling subsystem 300 extracting samples from the respective seeds, as described above, the master control system 700 controls the seed tray platform X-Y stage 512 to position a selected group of wells 506 at the respective target locations beneath two or more of the seed deposit tubes 408. When the selected group of wells 506 is placed at the respective target locations, the distal ends of each seed deposit tube 408 is in alignment with and in close proximity to, or in contact with, a corresponding one of the wells 506 in the selected group. Subsequently, the master control system 700 commands the sampling subsystem 300 to extract the samples from the respective seeds. Each sampled seed is then drawn into a corresponding diverter assembly 404 and transferred through the respective seed deposit tubes 408 to the corresponding selected seed collection tray well 506.

The master control system 700 can then compare the X-Y location of each deposited extracted sampled seed with the recorded positions of the wells 506 to map each extracted sampled seed to the respective well 506 of the respective seed collection tray 504 in which each sampled seed was deposited.

More particularly, the master control system 700 can then correlate, link, tie or map the specific well 606 and sample collection tray 604 into which each sample was deposited with the specific well 506 and seed collection tray 504 into which each corresponding sampled seed was deposited. Therefore, each sample and corresponding seed from which the sample was extracted can be tracked for crop analytics, or other purposes. For example, breeder can utilize the mapped data linking each seed sample with the respective sampled seed from which it was removed to pre-select seeds and only plant those that contain particular genes of interest.

Although the seed processing system 10 has been described and illustrated herein as including the pick and place device bank 212 to move oriented seeds from the orientation pedestals 204 to the sampling retention fixtures 304, whereafter the seeds are sampled, other embodiments of the seed processing system 10 are envisioned whereby each seed is retained and sampled on the respective orientation pedestals. For example, in various embodiments, each orientation pedestal 204 can include any retention fixture 304 described above connected to the distal end of the shaft 220 that is rotatable by the motor 224. Therefore, in such embodiments, when a seed is deposited onto an orientation pedestal 204, the seed is deposited directly on the respective retention fixture 304 from the seed transfer tube(s) 124. Thereafter, the respective retention fixture 304 firmly and steadily retains the seed and the seed is oriented with the 'Crown' toward the respective sampling assembly 316, via the orientation data collected by the imaging device(s) 208, as described above.

In such embodiments, each of the sampling assemblies 316 are movable, as controlled by the master control system 700, to position the respective cutting device in spatial relationship with each respective seed to remove the desired amount of sample from each seed. Therefore, once each seed has been deposited onto the respective orientation pedestal/retention fixture 204/304, each seed is oriented to position the 'Crown' toward the respective sampling assembly 316. Each respective sampling assembly is then moved to properly position the respective cutting device 340 with respect to the respective seed 'Crown', and the sample is removed. The sample and sampled seed are then extracted to the respective diverter assembly 404 and deposited into the corresponding sample and seed collection trays 604 and 504, as described above.

Figure 9:
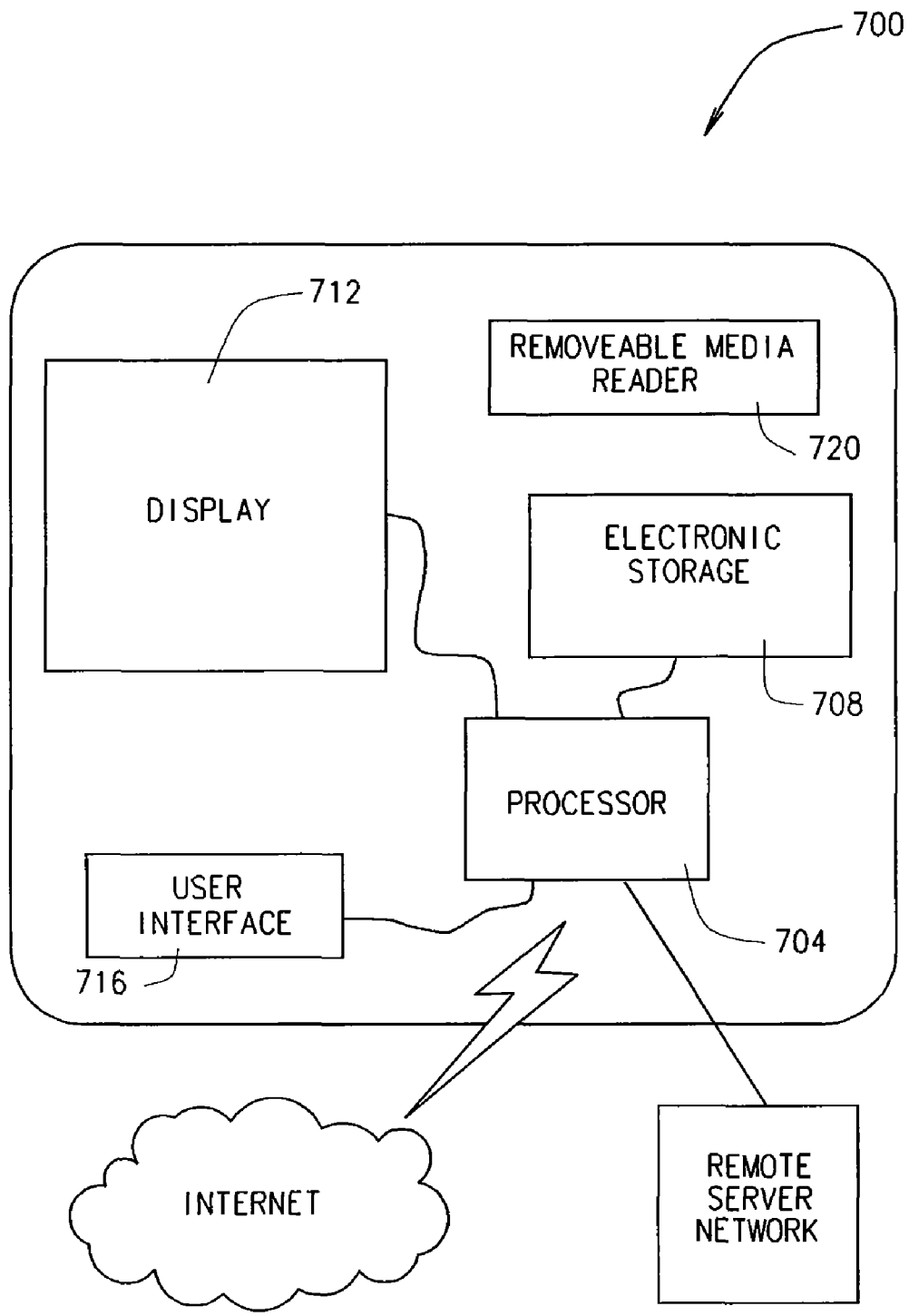
FIG. 9 is a block diagram of a master control system for the seed processing system shown in FIG. 1, in accordance with various embodiments of the present disclosure.

Referring to FIG. 9, as used herein, the master control system 700 can comprise a single computer based system, or a plurality of computer based subsystems networked together to coordinate the operations of the seed processing system 10, as described herein. For example, in various embodiments, the master control system 700 can include a plurality of controller subsystems, e.g., a controller subsystem for each station, system and subsystem of the seed sampler system 10 described herein. In such embodiments, each controller subsystem can include one or more processors or microprocessors that communicate with various seed sampling system sensors, devices, mechanisms, motors, tools, etc., and are networked together with a main controller system to cooperatively operate all the stations, systems and subsystems of the seed processing system 10.

Or, alternatively, the master control system 700 can comprise a single computer based system communicatively connected to all the various sensors, devices, mechanisms, motors, tools, etc., of the seed processing system 10 to cooperatively operate all the stations, systems and subsystems of the seed processing system 10. For example, in various embodiments, the master control system 700 is a computer based system that generally includes at least one processor 704 suitable to execute all functions of the master control system 700 to automatically, or robotically, control the operation of the seed processing system 10, as described herein. The master control system 700 additionally includes at least one electronic storage device 708 that comprises a computer readable medium, such as a hard drive or any other electronic data storage device for storing such things as software packages or programs, algorithms and digital information, data, look-up tables, electronic spreadsheets and databases, etc. In various embodiments, the master control system 700 can further include a display 712 for displaying such things as information, data and/or graphical representations, and at least one user interface device 716, such as a keyboard, mouse, stylus, scanner and/or an interactive touch-screen on the display 712. In various embodiments the master control system 700 can further include a removable media reader 720 for reading information and data from, and/or writing information and data to, removable electronic storage media such as floppy disks, compact disks, DVD disks, zip disks, or any other computer readable removable and portable electronic storage media. In various implementations, the removable media reader 720 can be an I/O port utilized to read external or peripheral memory devices such as thumb drives, memory sticks/cards or external hard drives.

Generally, the master control system 700, as described above, includes a seed sampling program, stored on a storage device, e.g., storage device 708, and executed by a processor, e.g., processor 704, using various inputs from a user interface, e.g., user interface 716, and/or various components, sensors, systems and assemblies of the seed processing system 10. Particularly, the seed sampling program can include various custom programs, applications, routines, subroutines and/or algorithms that are executable by the processor, e.g., processor 704, to effectuate and control the operation of the seed processing system 10.

Additionally, in various embodiments, the master control system 700, as described above, can be communicatively connectable to a remote server network, e.g., a local area network (LAN), via a wired or wireless link. Therefore, the master control system 700 can communicate with the remote server network to upload and/or download data, information, algorithms, software programs, etc., and/or receive operational commands. Additionally, in various forms, the master control system 700 can be configured to access the Internet to upload and/or download data, information, algorithms, software programs, etc., to and from Internet sites and network servers.

Samples prepared by the present disclosure can be used for determining a wide variety of physical, morphological, chemical and/or genetic traits. Generally, such traits are determined by analyzing the samples for one or more characteristics indicative of at least one genetic or chemical trait. Non-limiting examples of characteristics indicative of chemical traits include proteins, oils, carbohydrates, fatty acids, amino acids, biopolymers, pharmaceuticals, starch, fermentable starch, secondary compounds, and metabolites. Accordingly, non-limiting examples of chemical traits include amino acid content, protein content, starch content, fermentation yield, fermentation efficiency, energy yield, oil content, determination of protein profiles determination of fatty acid profiles, determination of metabolite profiles, etc.

Non-limiting examples of characteristics indicative of genetic traits may include, for example, genetic markers, single nucleotide polymorphisms, simple sequence repeats, restriction fragment length polymorphisms, haplotypes, tag SNPs, alleles of genetic markers, genes, DNA-derived sequences, RNA-derived sequences, promoters, 5' untranslated regions of genes, 3' untranslated regions of genes, microRNA, siRNA, quantitative trait loci (QTL), satellite markers, transgenes, mRNA, ds mRNA, transcriptional profiles, and methylation patterns.

The methods and devices of the present disclosure can be used in a breeding program to select plants or seeds having a desired genetic or chemical trait, wherein a desired genetic trait comprises a genotype, a haplotype, an allele, a sequence, a transcript profile, and a methylation pattern. The methods of the present disclosure can be used in combination with any breeding methodology and can be used to select a single generation or to select multiple generations.

In a particular embodiment, the methods of the present disclosure are used to determine the genetic characteristics of seeds in a marker-assisted breeding program. Such methods allow for improved marker-assisted breeding programs wherein nondestructive direct seed sampling can be conducted while maintaining the identity of individual seeds from the seed sampler to the field. As a result, the marker-assisted breeding program results in a "high-throughput" and more efficient platform wherein a population of seeds having a desired trait, marker or genotype can be more effectively bulked in a shorter period of time, with less field and labor resources required. Such advantages will be more fully described below.

In various embodiments, the present disclosure provides a method for analyzing individual seeds within a population of seeds having genetic differences. The method comprises removing a sample comprising cells with nucleic acids from seeds in the population without affecting the germination viability of the seeds; analyzing the nucleic acids extracted from the sample for the presence or absence of at least one genetic marker; selecting seeds from the population based upon the results of the nucleic acid analysis; and cultivating plants or plant tissue from the selected seed.

The extracted nucleic acids are analyzed for the presence or absence of a suitable genetic polymorphism. A wide variety of genetic markers for the analysis of genetic polymorphisms are available and known to those of skill in the art. As used herein, genetic markers include, but are not limited to, simple sequence repeats (SSRs), single nucleotide polymorphisms (SNPs), insertions or deletions (Indels), single feature polymorphisms (SFPs, for example, as described in Borevitz et al. 2003 Gen. Res. 13:513-523) or transcriptional profiles, and nucleic acid sequences. A nucleic acid analysis for the presence or absence of the genetic marker can be used for the selection of seeds in a breeding population. The analysis may be used to select for genes, QTL, alleles, or genomic regions (haplotypes) that comprise or are linked to a genetic marker. Herein, analysis methods are known in the art and include, but are not limited to, PCR-based detection methods (for example, TaqMan® assays), microarray methods, and nucleic acid sequencing methods. The genes, alleles, QTL, or haplotypes to be selected for can be identified using newer techniques of molecular biology with modifications of classical breeding strategies.

As described above, the sampling systems and methods of this disclosure protect germination viability of the seeds so as to be nondestructive. Germination viability means that a predominant number of sampled seeds, (i.e., greater than 50% of all sampled seeds) remain viable after sampling. In a particular embodiment, at least about 75% of sampled seeds, and in some embodiments at least about 85% of sampled seeds remain viable. It should be noted that lower rates of germination viability may be tolerable under certain circumstances or for certain applications, for example, genotyping costs decrease with time because a greater number of seeds could be sampled for the same genotype cost. It should also be noted that sampling does not need to have any effect on viability at all.

In another embodiment, germination viability is maintained for at least about six months after sampling to ensure that the sampled seed will be viable until it reaches the field for planting. In a particular embodiment, the methods of the present disclosure further comprise treating the sampled seeds to maintain germination viability. Such treatment may generally include any means known in the art for protecting a seed from environmental conditions while in storage or transport. For example, in various embodiments, the sampled seeds may be treated with a polymer and/or a fungicide to protect the sampled seed while in storage or in transport to the field before planting.

Several methods of preserving single seed identity can be used while transferring seed from the sampling location to the field. Methods include, but are not limited to, transferring selected individuals to seed tape, a cassette tray, or indexing tray, transplanting with peat pots, and hand-planting from individual seed packets.

DNA may be extracted from the sample using any DNA extraction methods known to those of skill in the art which will provide sufficient DNA yield, DNA quality, PCR response, and sequencing methods response. A non-limiting example of suitable DNA-extraction methods is SDS-based extraction with centrifugation. In addition, the extracted DNA may be amplified after extraction using any amplification method known to those skilled in the art. For example, one suitable amplification method is the GenomiPhi® DNA amplification prep from Amersham Biosciences.

Further, RNA may be extracted from the sample using any RNA extraction methods known to those of skill in the art which will provide sufficient RNA yield, RNA quality, PCR response, and sequencing methods response. A non-limiting example of suitable RNA-extraction methods is SDS-based extraction with centrifugation with consideration for RNase-free reagents and supplies. In addition, the extracted RNA may be amplified after extraction using any amplification method known to those skilled in the art. For example, one suitable amplification method is the Full Spectrum™ RNA Amplification from System Biosciences.

Although the present disclosure is generally directed toward the sampling of cucurbit seeds, one skilled in the art would recognize that any seed can generally be utilized in a method or device of the present disclosure. For example, in various embodiments, the seed can be selected from the group consisting of alfalfa seed, apple seed, banana seed, barley seed, bean seed, broccoli seed, castorbean seed, citrus seed, clover seed, coconut seed, coffee seed, maize seed, cotton seed, cucumber seed, Douglas fir seed, Eucalyptus seed, Loblolly pine seed, linseed seed, melon seed, oat seed, olive seed, palm seed, pea seed, peanut seed, pepper seed, poplar seed, Radiata pine seed, rapeseed seed, rice seed, rye seed, sorghum seed, Southern pine seed, soybean seed, strawberry seed, sugarbeet seed, sugarcane seed, sunflower seed, sweetgum seed, tea seed, tobacco seed, tomato seed, turf seed, wheat seed, and *Arabidopsis thaliana* seed. In a more particular embodiment, the seed is selected from the group consisting of broccoli seed, cabbage seed, carrot seed, cauliflower seed, chinese cabbage seed, cucumber seed, dry bean seed, eggplant seed, fennel seed, garden beans seed, gourd seed, leek seed, lettuce seed, melon seed, okra seed, onion seed, pea seed, pepper seed, pumpkin seed, radish seed, spinach seed, squash seed, sweet corn seed, tomato seed and watermelon seed. In an even more particular embodiment, the seed comprises cucumber seed, dry bean seed, garden bean seed, gourd seed, melon seed, pea seed, squash seed, sweet corn seed, okra seed and watermelon seed.

The methods of the disclosure may further be used in a breeding program for introgressing a trait into a plant. Such methods comprise removing a sample comprising cells with nucleic acids from seeds in a population, analyzing the nucleic acids extracted from each seed for the presence or absence of at least one genetic marker, selecting seeds from the population based upon the results of the nucleic acids analysis; cultivating a fertile plant from the seed; and utilizing the fertile plant as either a female parent or male parent in a cross with another plant.

For example, in various embodiments, the present disclosure provides for improved methods of producing hybrid seed. The method comprises introgressing genetic male-sterility controlled by single recessive nuclear genes into seeds to develop a population of seeds comprising male-sterile female parents. The population of seeds is then analyzed to identify seeds segregating for the marker, which are selected to be used as female parents to produce hybrid seed. The improved process is advantageous in that it does not require flower removal or hand emasculation, thereby allowing for the use of bees for pollination. Further, large volumes of seeds can be analyzed by this method and selected in one location and then shipped anywhere in the world for direct seeding to produce hybrid seed.

With exemplary reference to melon seeds, five single recessive nuclear genes have been identified in melon for controlling male sterility. Male-sterile lines always segregate for sterile and fertile plants because they must be maintained by pollinating male-sterile plants (ms/ms) with heterozygous, isogenic male-fertile plants (Ms/ms). Thus, the use of nuclear genic male-sterility requires that the male-fertile segregants be removed from the female parent rows in hybrid seed production fields. However, by genetically linking a molecular marker to a male-sterile gene, the apparatus, systems and methods of the present disclosure can be used to analyze segregating seeds for the marker and automatically select only seeds predicted to be male-sterile.

Figure 10:
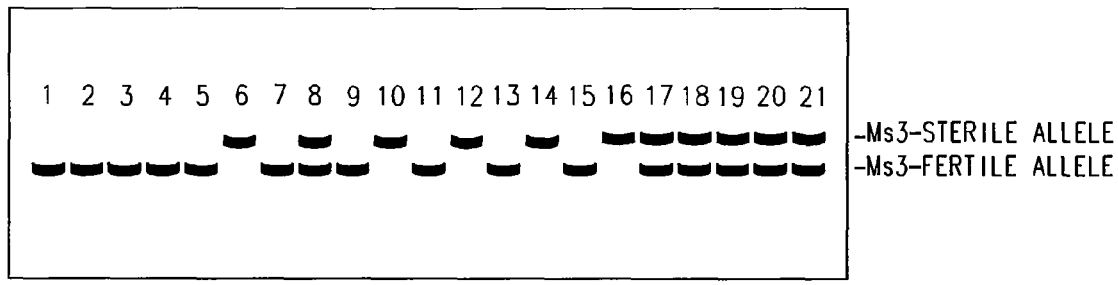
FIG. 10 is an image of agarose gel showing resolution of alleles at the marker linked to the ms3 gene.

Two of the five male sterile (ms) genes in melon have been mapped with molecular markers. The ms3 gene was initially mapped by Park et al., 2004. (See, Park et al., "Identification of RAPD and SCAR markers linked to the ms3 gene controlling male sterility in melon (Cucumis melon L.)." *J. Amer. Soc. Hort. Sci.* 129(6) 819-825 (2004)). Applicants have demonstrated that the ms3 marker described by Park et al. can be used for high-throughput analysis of DNA samples extracted from melon seeds (See FIG. 10). FIG. 10 provides an illustration of an agarose gel showing resolution of alleles at the marker linked to the ms3 gene. The ms3-sterile associated marker allele is the upper band in lanes 6, 8, 10, 12, 14, 16-21 and the ms3-fertile associated marker allele is the lower band in lanes 1-5, 7-9, 11, 13, 15, 17-21.

Figure 11:
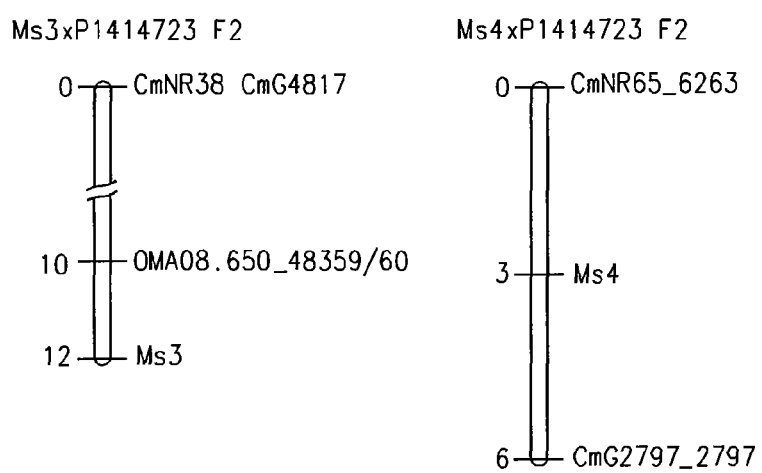
FIG. 11 illustrates genetic linkage groups containing the ms3 and ms4 genes showing positions of the ms genes relative to linked molecular markers.

Applicants have also mapped the ms3 gene onto a genetic linkage map (See FIG. 11). FIG. 11 provides an illustration of genetic linkage groups containing the ms3 and ms4 genes showing positions of the ms genes relative to linked molecular markers. Linkage distances (in cM) are shown to the left of linkage groups and molecular marker and ms loci are shown to the right of linkage groups.

Figure 12:
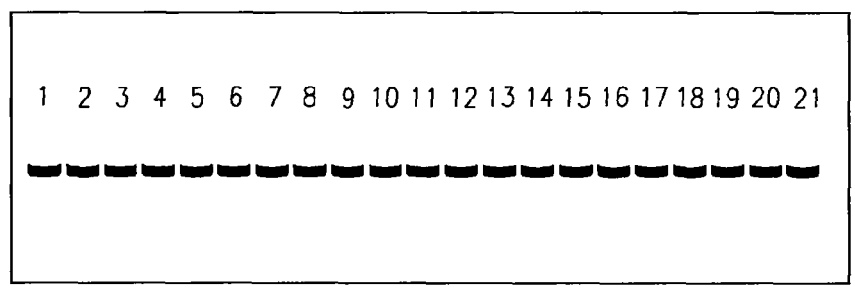
FIG. 12 is an agarose gel image showing PCR products from reaction mixes using DNA isolated from melon seed tissue samples.

Applicants have also mapped the ms4 gene to a position between two microsatellite markers CmNR65 and CmG2797 (See FIG. 12). FIG. 12 provides an illustration of an Agarose gel image showing PCR products from reaction mixes using DNA isolated from melon seed tissue samples. Experience to date suggests that the markers linked to the ms3 and ms4 genes provide the necessary marker tools for efficient introgression of ms genes into female parent lines of melon as well as for selection, using the methods of automated, nondestructive seed sampling and marker analysis described herein, of male sterile genotypes (ms/ms) from stock seed lots of female parent lines segregating for sterility.

Advantages of using the methods of this disclosure include, without limitation, reduction of labor and field resources required per population or breeding line, increased capacity to evaluate a larger number of breeding populations per field unit, and increased capacity to analyze breeding populations for desired traits prior to planting. Field resources per population are reduced by limiting the field space required to advance the desired genotypes. For example, a population of 1,000 individuals may be planted at 25 seeds per row consuming a total of 40 rows in the field. Using conventional tissue sampling, all 1,000 plants would be tagged and manually sampled by scoring leaf tissue. Molecular marker results would be needed prior to pollination and only those plants containing the desired genetic composition would be pollinated. Thus, if it was determined that 50 seeds contained the desired genetic composition, conventional breeding methodology would have required the planting of 1000 plants to retain the desired 50 seeds. By contrast, the methods of this disclosure allow the breeder to analyze the 1,000 seeds in the lab and select the 50 desired seeds prior to planting. The 50 individuals can then be planted in the field, consuming only two 25 seed rows. Additionally, the methods of this disclosure do not require tagging or sampling in the field, thereby significantly reducing the required manual labor resources.

In addition to reducing the number of field rows per population, the methods of this disclosure may further increase the number of populations the breeder can evaluate in a given breeding nursery. Using the above example wherein 50 seeds out of each population of 1000 seeds contained the desired genetic composition, a breeder applying the methods of this disclosure could evaluate 20 populations of 50 seeds each using the same field area consumed by a single population using conventional field tissue sampling techniques. Even if the populations are selected for a single allele, using a 1:2:1 expected segregation ratio for an $F_2$ population, the breeder could evaluate 4 populations in the same field area as a single field tissue sampled population.

A potential further advantage to the methods of the present disclosure is the mitigation of risks associated with growing plants in certain geographies where plants may grow poorly or experience poor environmental conditions including disease, or may even be destroyed during storms.

\*\*\*\*\*\*\*\*

When introducing elements or features of embodiments herein, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

The description of the disclosure is merely exemplary in nature and, thus, variations that do not depart from the gist of the disclosure are intended to be within the scope of the disclosure. Such variations are not to be regarded as a departure from the spirit and scope of the disclosure.

What is claimed is:

1. A method for introgressing male sterility into a hybrid seed, the method comprising:
    providing a population of hybrid seeds;
    separating, via an automated seed singulator, individual seeds from the population of hybrid seeds;
    removing a tissue sample comprising cells with nucleic acids from the individual, separated seeds, via an automated sampling assembly, while preserving the germination viability of each seed;
    analyzing nucleic acids extracted from each tissue sample to determine the presence of at least one genetic marker indicating the presence of a male-sterile gene;
    selecting particular seeds from the individual sampled seeds based upon the determination of the presence of the male-sterile marker in the particular seeds; and
    cultivating fertile plants from the selected seeds to introgress male sterility into seeds provided by the cultivated fertile plants.

2. The method of claim 1, wherein the method further comprises utilizing the fertile plant as a female parent in a cross with another plant.

3. The method of claim 1 wherein the hybrid seed comprises seed selected from the group consisting of cucumber seed, dry bean seed, garden bean seed, gourd seed, melon seed, pea seed, squash seed, sweet corn seed, okra seed and watermelon seed.

4. An automated method for introgressing male sterility into hybrid seeds, the method comprising:
    separating individual hybrid seeds from a plurality of hybrid seeds at a seed loading station of an automated seed processing system;
    automatically receiving the separated individual seeds at an orientation subsystem of the automated seed processing system;
    automatically orienting each individual seed received at the orientation subsystem;

automatically removing a tissue sample comprising cells with nucleic acids from each of the individual seeds, while preserving the germination viability of each seed, via an automated sampling subsystem of the automated seed processing system;

automatically depositing each sampled seed into a selected well in a selected one of a plurality of seed collection trays after the seed has had the tissue sample removed, and depositing each tissue sample into a selected well in a selected one of a plurality of sample collection trays after the sample has been removed from the seed utilizing a seed and sample transport subsystem of the automated seed processing system;

storing in a database information identifying the selected well and the selected sample collection tray into which each tissue sample was deposited and the selected well and the selected seed collection tray into which each corresponding sampled seed was deposited, such that each sample and corresponding seed from which the sample was removed can be tracked to provide single seed identity of each seed to the corresponding sample removed therefrom;

analyzing nucleic acids extracted from each tissue sample to identify the tissue samples having at least one genetic marker indicating the presence of a male-sterile gene;

selecting particular seeds from the seed collection tray that correspond with the tissue samples identified as having the male-sterile marker utilizing the information stored in the database; and cultivating fertile plants from each of the selected seeds to introgress male sterility into seeds provided by the cultivated fertile plants.

5. The method of claim 4 further comprising utilizing the fertile plant as a female parent in a cross with another plant.

6. The method of claim 4 wherein the hybrid seeds comprise seeds selected from the group consisting of cucumber seed, dry bean seed, garden bean seed, gourd seed, melon seed, pea seed, squash seed, sweet corn seed, okra seed and watermelon seed.

7. The method of claim 4, wherein receiving and orienting the individual seeds comprises depositing each seed onto a corresponding one of a plurality of orientation pedestals of the orientation subsystem and retaining each seed on the respective orientation pedestal without damaging the embryo of each seed.

8. The method of claim 7, wherein receiving and orienting the individual seeds further comprises collecting orientation data of each seed retained on the respective orientation pedestal and utilizing the collected orientation data to orient each seed in a particular orientation without damaging the embryo of each seed.

9. The method of claim 8, wherein removing a tissue sample from the individual seeds comprises:
 depositing each oriented seed into a corresponding one of a plurality of sampling retention fixtures having a 'Tip' of each seed, containing the embryo, positioned away from a cutting device of each of a corresponding one of the plurality of sampling assemblies associated with the sampling retention fixtures, each sampling assembly associated with a corresponding one of the sampling retention fixtures; and
 firmly and securely holding each seed within the respective sampling retention fixture, without damaging the embryo of each seed, as each respective cutting device removes the tissue sample from a portion of each seed not containing the embryo.

10. The method of claim 9, wherein removing a tissue sample from the individual seeds further comprises abutting a 'Crown' of each seed against a corresponding one of a plurality of datum blocks associated with the sampling retention fixtures, each datum block associated with a corresponding one of the sampling retention fixtures, such that a particular amount of the 'Crown' of each seed is removed as the tissue sample without damaging the embryo of each respective seed.

11. The method of claim 4, wherein removing a tissue sample from the individual seeds further comprises:
 removing a first portion of each seed comprising the skin of each respective seed; and
 removing a second portion of each seed comprising tissue usable as the sample and suitable for the genetic analysis.

* * * * *